US012200849B2

(12) United States Patent
Trice et al.

(10) Patent No.: US 12,200,849 B2
(45) Date of Patent: Jan. 14, 2025

(54) MICROWAVE COOKING APPLIANCE WITH USER INTERFACE DISPLAY

(71) Applicant: Midea Group Co., Ltd., Foshan (CN)

(72) Inventors: Daniel J. Trice, Louisville, KY (US); Brian Langness, Shelbyville, KY (US); Pierce Woodling, Louisville, KY (US)

(73) Assignee: MIDEA GROUP CO., LTD., Guangdong (CN)

(*) Notice: Subject to any disclaimer, the term of this patent is extended or adjusted under 35 U.S.C. 154(b) by 0 days.

(21) Appl. No.: 18/473,838

(22) Filed: Sep. 25, 2023

(65) Prior Publication Data

US 2024/0015861 A1 Jan. 11, 2024

Related U.S. Application Data

(63) Continuation of application No. 17/037,460, filed on Sep. 29, 2020, now Pat. No. 11,770,882, which is a continuation-in-part of application No. 16/836,286, filed on Mar. 31, 2020, now Pat. No. 11,849,526.

(51) Int. Cl.
*H05B 6/64* (2006.01)
*H05B 6/76* (2006.01)

(52) U.S. Cl.
CPC ......... *H05B 6/6435* (2013.01); *H05B 6/6414* (2013.01); *H05B 6/6432* (2013.01); *H05B 6/763* (2013.01); *H05B 6/766* (2013.01)

(58) Field of Classification Search
CPC .. H05B 6/6411; H05B 6/6414; H05B 6/6417; H05B 6/6432; H05B 6/6435; H05B 6/6447; H05B 6/6482; H05B 6/666; H05B 6/668; H05B 6/687; H05B 6/76; H05B 6/763; H05B 6/766
USPC .................................................. 219/736–744
See application file for complete search history.

(56) References Cited

U.S. PATENT DOCUMENTS

| | | | |
|---|---|---|---|
| 2,958,754 | A | 11/1960 | Hahn |
| 3,748,424 | A | 7/1973 | Fitzmayer |
| 3,843,859 | A | 10/1974 | Klemp et al. |
| 4,010,343 | A | 3/1977 | Tanaka |

(Continued)

FOREIGN PATENT DOCUMENTS

| | | | |
|---|---|---|---|
| CA | 1038045 | A | 9/1978 |
| CN | 1523293 | A | 8/2004 |

(Continued)

OTHER PUBLICATIONS

International Search Report and Written Opinion in International Application No. PCT/IB2022/056651, 10 pages, dated Oct. 17, 2022.

(Continued)

*Primary Examiner* — Hung D Nguyen
(74) *Attorney, Agent, or Firm* — Gray Ice Higdon

(57) ABSTRACT

A microwave cooking appliance for increasing visibility into the cooking cavity. The microwave cooking appliance may include a door. The door may include a conductive mesh layer. The door may include a frame supporting the conductive mesh layer. The door may include a conductive and/or sealing engagement between the conductive mesh layer and the frame. The door may include a leak detection device. The leak detection device may be adjacent the conductive and/or sealing engagement. The door may include a user interface display and/or a touch screen.

25 Claims, 12 Drawing Sheets

(56) References Cited

U.S. PATENT DOCUMENTS

| | | | | |
|---|---|---|---|---|
| 4,032,910 | A | 6/1977 | Hollway et al. | |
| 4,054,768 | A | 10/1977 | White et al. | |
| 4,313,044 | A | 1/1982 | Staats | |
| 4,338,595 | A | 7/1982 | Newman | |
| 4,354,153 | A | 10/1982 | Lentz | |
| 4,529,855 | A | 7/1985 | Fleck | |
| 4,571,581 | A | 2/1986 | Smith et al. | |
| 5,160,806 | A | 11/1992 | Harada et al. | |
| 5,581,237 | A | 12/1996 | DiPoala | |
| 5,981,927 | A | 11/1999 | Osepchuk et al. | |
| 6,822,208 | B2 | 11/2004 | Henze | |
| 7,053,348 | B1 | 5/2006 | Terada | |
| 7,294,811 | B2 | 11/2007 | Kawashima | |
| 8,143,560 | B2 * | 3/2012 | Park | F24C 7/085 219/757 |
| 8,426,749 | B2 | 4/2013 | Saneto et al. | |
| 8,710,409 | B2 * | 4/2014 | Busalt | E05F 15/70 126/192 |
| 8,772,687 | B2 | 7/2014 | Boxman et al. | |
| 9,052,536 | B2 | 6/2015 | Artwohl et al. | |
| 9,244,356 | B1 | 1/2016 | Kobrin | |
| 9,311,834 | B2 | 4/2016 | Lee et al. | |
| 10,009,957 | B2 | 6/2018 | Pereira et al. | |
| 10,436,504 | B2 | 10/2019 | Lee | |
| 10,528,087 | B2 | 1/2020 | Kang et al. | |
| 10,531,524 | B2 | 1/2020 | Millett | |
| 10,716,433 | B2 | 7/2020 | Kim | |
| 10,779,365 | B2 | 9/2020 | Millett | |
| 11,246,192 | B2 | 2/2022 | Huang et al. | |
| 11,268,704 | B2 | 3/2022 | O'Ryan | |
| 2004/0164075 | A1 | 8/2004 | Henze | |
| 2004/0245246 | A1 | 12/2004 | Bakanowski et al. | |
| 2005/0067412 | A1 | 3/2005 | Kim | |
| 2006/0138127 | A1 | 6/2006 | Kawashima | |
| 2006/0289525 | A1 | 12/2006 | Hovorka | |
| 2008/0223855 | A1 | 9/2008 | Boxman | |
| 2009/0008387 | A1 | 1/2009 | Boxman | |
| 2009/0039068 | A1 | 2/2009 | Boutwell et al. | |
| 2009/0128893 | A1 | 5/2009 | McCarthy | |
| 2012/0036900 | A1 | 2/2012 | Hong et al. | |
| 2013/0068521 | A1 | 3/2013 | Hong et al. | |
| 2016/0220039 | A1 | 8/2016 | Chang et al. | |
| 2017/0099988 | A1 * | 4/2017 | Matloubian | A47J 37/0664 |
| 2017/0245680 | A1 | 8/2017 | Kim et al. | |
| 2018/0035495 | A1 | 2/2018 | Millett | |
| 2018/0054860 | A1 | 2/2018 | Kim et al. | |
| 2018/0220500 | A1 * | 8/2018 | Staton | A47J 37/0623 |
| 2018/0220501 | A1 | 8/2018 | Jung et al. | |
| 2019/0059133 | A1 | 2/2019 | Leindecker et al. | |
| 2019/0159303 | A1 | 5/2019 | Zhao | |
| 2019/0221144 | A1 | 7/2019 | Artwohl et al. | |
| 2019/0249485 | A1 | 8/2019 | Jeong et al. | |
| 2019/0350407 | A1 * | 11/2019 | Sharpe | A47J 37/0664 |
| 2020/0120766 | A1 | 4/2020 | Millett | |
| 2020/0288544 | A1 | 9/2020 | Gwarek | |
| 2020/0344852 | A1 | 10/2020 | Millett | |
| 2021/0051774 | A1 | 2/2021 | Jung et al. | |
| 2021/0307128 | A1 | 9/2021 | Trice et al. | |
| 2021/0307129 | A1 | 9/2021 | Trice et al. | |
| 2021/0307130 | A1 | 9/2021 | Trice et al. | |
| 2022/0030676 | A1 | 1/2022 | Huang et al. | |
| 2022/0039220 | A1 | 2/2022 | Kolheb et al. | |
| 2023/0036961 | A1 | 2/2023 | Pala | |
| 2024/0080949 | A1 | 3/2024 | Trice et al. | |

FOREIGN PATENT DOCUMENTS

| | | | |
|---|---|---|---|
| CN | 1796876 | A | 7/2006 |
| CN | 100387904 | C | 5/2008 |
| CN | 100529549 | C | 8/2009 |
| CN | 101868738 | A | 10/2010 |
| CN | 203431951 | U | 2/2014 |
| CN | 105042654 | A | 11/2015 |
| CN | 204987134 | U | 1/2016 |
| CN | 106103555 | A | 11/2016 |
| CN | 108700302 | A | 10/2018 |
| CN | 109838962 | A | 6/2019 |
| DE | 69203008 | T2 | 1/1996 |
| DE | 10307217 | A1 | 9/2004 |
| EP | 0503899 | A2 | 9/1992 |
| EP | 1450584 | A1 | 8/2004 |
| EP | 3122805 | A1 | 2/2017 |
| EP | 3269204 | A1 | 1/2018 |
| EP | 3368828 | A1 | 9/2018 |
| FR | 2976651 | A1 | 12/2012 |
| GB | 1180232 | A | 2/1970 |
| IN | 201817036519 | | 9/2018 |
| JP | 3079960 | B2 | 8/2000 |
| JP | 3204677 | B2 | 9/2001 |
| JP | 2003317929 | A | 11/2003 |
| JP | 2004012032 | A | 1/2004 |
| JP | 2006183885 | A | 7/2006 |
| JP | 2008060014 | A | 3/2008 |
| JP | 2008060015 | A | 3/2008 |
| JP | 4284394 | B2 | 6/2009 |
| JP | 2010021824 | A | 1/2010 |
| JP | 2017512680 | A | 5/2017 |
| KR | 920018418 | A | 10/1992 |
| KR | 200204741 | Y1 | 12/2000 |
| KR | 20160135814 | A | 11/2016 |
| KR | 20170101554 | A | 9/2017 |
| WO | 2007046085 | A2 | 4/2007 |
| WO | 2015145355 | A1 | 10/2015 |
| WO | 2016144312 | A1 | 9/2016 |
| WO | 2017150897 | A1 | 9/2017 |
| WO | 2018102983 | A1 | 6/2018 |
| WO | 2018133021 | A1 | 7/2018 |
| WO | 2018188913 | A1 | 10/2018 |
| WO | 2019159078 | A1 | 8/2019 |

OTHER PUBLICATIONS

Tung, et al., High Optical Visibility and Shielding Effectiveness Metal Mesh Film for Microwave Oven Application, IEEE Transactions on Electromagnetic Compatibility, vol. 62, No. 4/p. 1076-1081, 6 pages, dated 2020.

Zin, et al., Measurements and reduction of microwave oven electromagnetic leakage, IEEE International RF and Microwave Conference, 4 pages, dated 2011.

Rubinger, et al., Microwave shielding of fluorine-doped tin oxide film obtained by spray pyrolysis studied by electrical characterization, Journal of Applied Physics, vol. 105, No. 7, 4 pages, dated 2009.

Lio, Shannon, Whirlpool's Smart Oven Uses AR to Assist Your Baking, The Verge, Jan. 8, 2019.

The June Oven, Turn Cooking Stress Into Dinnertime Success, Retrieved from https://juneoven.com/the-oven, Retrieved on Jan. 27, 2020.

Eleazar, Arnold I., et al., The Development and Performance Evaluation of a Locally Made Microwave Oven Leakage Detector, Australas. Phys. Eng. Sci. Med. vol. 30, No. 4 2007.

Zeha, Pandhare A., et al., Indication of microwave oven leakage by using LED and Buzzer, 2015 International Conference of Computing Communication Control and Automation, pp. 542-545, 2015.

Gartenberg, Chaim, LG's New ThinQ Smart Fridge has a Transparent 29-Inch Touchscreen and Runs WebOS, The Verge Jan. 7, 2018.

Nguyen, Hung D., United States Patent and Trademark Office, Non-Final Office Action issued in U.S. Appl. No. 16/836,286, 38 pages, dated Aug. 2, 2022.

Nguyen, Hung D., United States Patent and Trademark Office, Non-Final Office Action issued in U.S. Appl. No. 17/037,460, 63 pages, dated Jan. 17, 2023.

Nguyen, Hung D., United States Patent and Trademark Office, Non-Final Office Action issued in U.S. Appl. No. 17/037,463, 41 pages, dated Jan. 17, 2023.

Jiang, Zhouying, et al.; Embedded Flexible and Transparent Double-Layer Nickel-Mesh for High Shielding Efficiency; Optical Society of America; vol. 28, No. 18/31; 12 pages; dated Aug. 24, 2020.

(56) References Cited

OTHER PUBLICATIONS

Tran, et al.; Electromagnetic Interference Shielding by Transparent Graphene/Nickel Mesh Films; 12 pages; abstract retrieved from https://pubs.acs.org/doi/10.1021/acsanm.0c01076; dated 2020.

Voronin, et al.; Low Cost Embedded Copper Mesh Based on Cracked Template for Highly Durability Transparent EMI Shielding Films; MDPI Materials 22, 15, 1449; 17 pages; retrieved from https://www.mdpi.com/1996-1944/15/4/1449; dated Feb. 15, 2022.

Nguyen, Hung D., United States Patent and Trademark Office, Non-Final Office Action issued in U.S. Appl. No. 17/836,286, 25 pages, dated Mar. 8, 2023.

Nguyen, Hung D., United States Patent and Trademark Office, Notice of Allowance issued in U.S. Appl. No. 17/037,463, 24 pages, dated May 4, 2023.

Nguyen, Hung D., United States Patent and Trademark Office, Notice of Allowance issued in U.S. Appl. No. 17/037,460, 23 pages, dated May 16, 2023.

Nguyen, Hung D., United States Patent and Trademark Office, Notice of Allowance issued in U.S. Appl. No. 16/836,286, 26 pages, dated Jun. 14, 2023.

Nguyen, Hung D., United States Patent and Trademark Office, Non-Final Office Action issued in U.S. Appl. No. 18/506,497, 73 pages, dated Jun. 18, 2024.

Nguyen, Hung D., United States Patent and Trademark Office, Notice of Allowance issued in U.S. Appl. No. 18/506,497, 18 pages, dated Oct. 10, 2024.

* cited by examiner

MICROWAVE COOKING APPLIANCE WITH USER INTERFACE DISPLAY

BACKGROUND

The present embodiments relate to a microwave cooking appliance integrated with a user interface display.

Typical microwave cooking appliances may include a door with reduced transparency into the cooking cavity. Physically opening the microwave door may be needed to see the contents within the cooking cavity. Thus, there is a need for increasing visibility through the door, increasing consumer interaction, and/or increasing the communication of information to the consumer.

SUMMARY

In some embodiments of the invention, for example, a microwave cooking appliance comprising a door and/or housing. In various embodiments, the housing may include the door to form a cooking cavity, wherein the door includes an interior face arranged to face towards the cooking cavity and an exterior face arranged to face away from the cooking cavity. In some embodiments, the door may include a conductive mesh layer and one or more glass layers. In various embodiments, the door may include a frame having an outer periphery and a choke groove extending along the outer periphery, wherein the frame supports the conductive mesh layer and the one or more glass layers, and wherein the conductive mesh layer is electrically grounded to the frame.

In some embodiments, the door further includes one or more conductive engagements between the frame and the conductive mesh layer, wherein the one or more conductive engagements includes at least one of a conductive glass sealant, a conductive gasket, a conductive tape, and/or a mechanical fastener electrically grounding the frame to the conductive mesh layer. In various embodiments, the mechanical fastener may be a metal clip. Moreover, in some embodiments, the metal clip may be a spring clip. In some embodiments, the door may include the conductive gasket. In various embodiments, the door may include the conductive tape, wherein the conductive tape surrounds an outer edge of the conductive mesh layer and one or more glass layers. In some embodiments, the door may include the conductive tape. In various embodiments, the frame may be molded to the conductive mesh layer and the one or more glass layers. In some embodiments, at least a portion of the choke groove may be made of the conductive mesh layer and the one or more glass layers.

In various embodiments, a microwave cooking appliance comprising a housing and/or a door. In some embodiments, the housing may include the door to form a cooking cavity, wherein the door may include an interior face arranged to face towards the cooking cavity and an exterior face arranged to face away from the cooking cavity. In various embodiments, the door may include a conductive mesh layer and one or more glass layers. In some embodiments, the door may include a frame having an inner periphery defining a through opening, an outer periphery, and a choke groove extending along the outer periphery, wherein the frame supports the conductive mesh layer and the one or more glass layers across the through opening, and wherein the conductive mesh layer is electrically grounded to the frame.

In addition, in some embodiments, the one or more glass layers may include an inner glass layer and an outer glass layer, wherein the conductive mesh layer may be layered between the inner glass layer and the outer glass layer. In various embodiments, a conductive tape may engage an outer edge of the conductive mesh layer and one or more glass layers, wherein the conductive tape is electrically grounded between the conductive mesh layer and the frame. Moreover, in some embodiments, the one or more glass layers may include a single glass layer, wherein the conductive mesh layer may be layered on at least one of an interior facing side and an exterior facing side of the single glass layer. In some embodiments, the conductive mesh layer may allow at least 80% optical transmittance into the cooking cavity. In various embodiments, the conductive mesh layer may include an EMI shielding effectiveness of about 30 dB to about 70 dB while maintaining optical transmittance of about 88% to about 99%. In various embodiments, the door may further include one or more conductive engagements between the frame and the conductive mesh layer, wherein the one or more conductive engagements may include at least one of a conductive glass sealant, a conductive gasket, a conductive tape, and/or a mechanical fastener electrically grounding the frame to the conductive mesh layer.

In some embodiments, a door for a microwave cooking appliance may comprise a multi-layered shielding panel and/or a frame. In various embodiments, the multi-layered shielding panel may have a conductive mesh layer and one or more glass layers. In some embodiments, the frame may have an inner periphery defining a through opening, an outer periphery, and a choke groove extending along the outer periphery, wherein the frame may support the a multi-layered shielding panel across the through opening, and wherein the conductive mesh layer is electrically grounded to the frame.

In addition, in some embodiments, the conductive mesh layer may include an EMI shielding effectiveness of about 30 dB to about 70 dB while maintaining optical transmittance of about 88% to about 99%. In various embodiments, the one or more glass layers may include an inner glass layer and an outer glass layer, wherein the conductive mesh layer may be layered between the inner glass layer and the outer glass layer. Moreover, in some embodiments, the one or more glass layers may include a single glass layer, wherein the conductive mesh layer may be layered on at least one of an interior facing side and an exterior facing side of the single glass layer. In various embodiments, the door may include one or more conductive engagements between the frame and the conductive mesh layer.

In some embodiments, a microwave cooking appliance may comprise a housing having a door to form a cooking cavity, wherein the door includes an interior face arranged to face towards the cooking cavity and an exterior face arranged to face away from the cooking cavity. In various embodiments, the door may comprise a conductive mesh layer and one or more glass layers. In some embodiments, the door may include a frame having an outer periphery and a choke groove extending along the outer periphery, wherein the frame supports the conductive mesh layer and the one or more glass layers, and wherein the conductive mesh layer may be electrically grounded to the frame. In various embodiments, the door may include a leak detection device.

In addition, in some embodiments, the leak detection device may be positioned adjacent an inner periphery of the frame and the conductive mesh layer. In various embodiments, the door further may include one or more conductive engagements between the frame and the conductive mesh layer, wherein the leak detection device may be positioned adjacent the one or more conductive engagements. In some embodiments, the one or more conductive engagements may include at least one of a conductive glass sealant, a conductive gasket, a conductive tape, and/or a mechanical fastener electrically grounding the frame to the conductive mesh layer. In various embodiments, the mechanical fastener may be a metal clip. Moreover, in some embodiments, the conductive engagement may include the conductive gasket. In various embodiments, the conductive engagement may include the conductive tape, wherein the conductive tape surrounds an outer edge of the conductive mesh layer and one or more glass layers. In some embodiments, the leak detection device may include one or more light sources. In various embodiments, the one or more light sources may include one or more LEDs. In some embodiments, the one or more LEDs may be activated when microwave energy escapes away from at least one of the frame and the mesh layer. In some embodiments, the leakage detection device may be a plurality of LEDs annularly spaced in the door activated when microwave energy escapes away from at least one of the frame and the mesh layer.

In some embodiments, a microwave cooking appliance may comprise a housing having a door to form a cooking cavity, wherein the door may include an interior face arranged to face towards the cooking cavity and an exterior face arranged to face away from the cooking cavity. In various embodiments, the door may comprise a conductive mesh layer and one or more glass layers. In some embodiments, the door may include a frame having an inner periphery defining a through opening, an outer periphery, and a choke groove extending along the outer periphery, wherein the frame supports the conductive mesh layer and the one or more glass layers across the through opening, and wherein the conductive mesh layer is electrically grounded to the frame. In various embodiments, the door may include a leak detection device positioned adjacent the inner periphery defining the through opening.

In addition, in some embodiments, the leak detection device may include one or more light sources. In various embodiments, the one or more light sources may include one or more LEDs. In some embodiments, the one or more LEDs may be activated when microwave energy escapes away from at least one of the frame and the mesh layer. In various embodiments, the conductive mesh layer may allow at least 80% optical transmittance into the cooking cavity and includes an EMI shielding effectiveness of about 30 dB to about 70 dB. Moreover, in some embodiments, the door may include one or more conductive engagements between the frame and the conductive mesh layer, wherein the one or more conductive engagements includes at least one of a conductive glass sealant, a conductive gasket, a conductive tape, and/or a mechanical fastener electrically grounding the frame to the conductive mesh layer.

In addition, in some embodiments, a door for a microwave cooking appliance may comprise a multi-layered shielding panel having a conductive mesh layer and one or more glass layers. In various embodiments, the door may include a frame having an inner periphery defining a through opening, an outer periphery, and a choke groove extending along the outer periphery, wherein the frame supports the a multi-layered shielding panel across the through opening, and wherein the conductive mesh layer is electrically grounded to the frame. In some embodiments, the door may include one or more light sources adjacent the inner periphery defining the through opening, wherein the one or more light sources are activated when microwave energy escapes away from at least one of the frame and the mesh layer.

In addition, in some embodiments, the conductive mesh layer may include an EMI shielding effectiveness of about 30 dB to about 70 dB while maintaining optical transmittance of about 88% to about 99%. In various embodiments, the door may include one or more conductive engagements between the frame and the conductive mesh layer. In some embodiments, the one or more light sources may be a plurality of LEDs annularly spaced in an exterior side of the door.

In some embodiments, a microwave cooking appliance may comprise a housing having a door to form a cooking cavity, wherein the door includes an interior face arranged to face towards the cooking cavity and an exterior face arranged to face away from the cooking cavity. In various embodiments, the door may comprise a conductive mesh layer and one or more glass layers. In some embodiments, the door may include a frame having an outer periphery and a choke groove extending along the outer periphery, wherein the frame supports the conductive mesh layer and the one or more glass layers, and wherein the conductive mesh layer is electrically grounded to the frame. In various embodiments, the door may include a user interface panel.

In addition, in some embodiments, the user interface panel may be disposed over the conductive mesh layer. In various embodiments, the door may further includes one or more conductive engagements between the frame and the conductive mesh layer, wherein the leak detection device may be positioned adjacent the one or more conductive engagements. In some embodiments, the one or more conductive engagements may include at least one of a conductive glass sealant, a conductive gasket, a conductive tape, and/or a mechanical fastener electrically grounding the frame to the conductive mesh layer. In various embodiments, the conductive engagement may include the mechanical fastener, wherein the mechanical fastener may be a metal clip. In some embodiments, the conductive engagement may include the conductive gasket. In various embodiments, the conductive engagement may include the conductive tape, wherein the conductive tape may surround an outer edge of the conductive mesh layer and one or more glass layers. Moreover, in some embodiments, the user interface panel may include an outer protective layer. In various embodiments, the door may include one or more first contact pins and a remaining portion of the housing may have one or more second contact pins, wherein the one or more first contact pins engage the one or more second contact pins when the door is in a closed position and wherein the one or more first contact pins are disengaged from the one or more second contact pins when the door is in an open position. In some embodiments, the user interface display may be positionable between a transparent configuration and an opaque configuration. In various embodiments, the user interface display may include a touch screen configured to receive input from the user.

In some embodiments, a microwave cooking appliance may comprise a housing having a door to form a cooking cavity, wherein the door may include an interior face arranged to face towards the cooking cavity and an exterior face arranged to face away from the cooking cavity. In various embodiments, the door may comprise a conductive mesh layer and one or more glass layers. In some embodiments, the door may include a frame having an inner periphery defining a through opening, an outer periphery, and a choke groove extending along the outer periphery, wherein the frame may support the conductive mesh layer and the one or more glass layers across the through opening, and wherein the conductive mesh layer is electrically grounded to the frame. In various embodiments, the door may include a transparent user interface display disposed over the through opening and towards the exterior face of the door away the frame, conductive mesh layer, and one or more glass layers.

In addition, in some embodiments, the transparent user interface display may include an outer protective layer. In various embodiments, the transparent user interface display may include a touch screen configured to receive input from the user. In some embodiments, the door may include one or more contact pins to engage a remaining portion of the housing when in a closed position. Moreover, in various embodiments, the conductive mesh layer may allow at least 80% optical transmittance into the cooking cavity and includes an EMI shielding effectiveness of about 30 dB to about 70 dB. In some embodiments, the door may include one or more conductive engagements between the frame and the conductive mesh layer, wherein the one or more conductive engagements includes at least one of a conductive glass sealant, a conductive gasket, a conductive tape, and/or a mechanical fastener electrically grounding the frame to the conductive mesh layer.

In some embodiments, a door for a microwave cooking appliance may comprise a multi-layered shielding panel having a conductive mesh layer and one or more glass layers. In various embodiments, the door may include a frame having an inner periphery defining a through opening, an outer periphery, and a choke groove extending along the outer periphery, wherein the frame supports the a multi-layered shielding panel across the through opening, and wherein the conductive mesh layer is electrically grounded to the frame. In some embodiments, the door may include a transparent user interface display disposed over the through opening and exterior to the conductive mesh layer and one or more glass layers.

In addition, in some embodiments, the conductive mesh layer may include an EMI shielding effectiveness of about 30 dB to about 70 dB while maintaining optical transmittance of about 88% to about 99%. In various embodiments, the door may include one or more conductive engagements between the frame and the conductive mesh layer. In some embodiments, the transparent user interface display may include a touch screen configured to receive input from the user. Moreover, in some embodiments, the transparent user interface display may include an outer protective layer.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a microwave cooking appliance, such as the type that may be used in single-family or multi-family dwellings, or in other similar applications. However, it will be appreciated that the herein-described techniques may also be used in connection with other types of microwave cooking appliances in some embodiments. For example, the herein-described techniques may be used in commercial applications in some embodiments.

Figure 1:
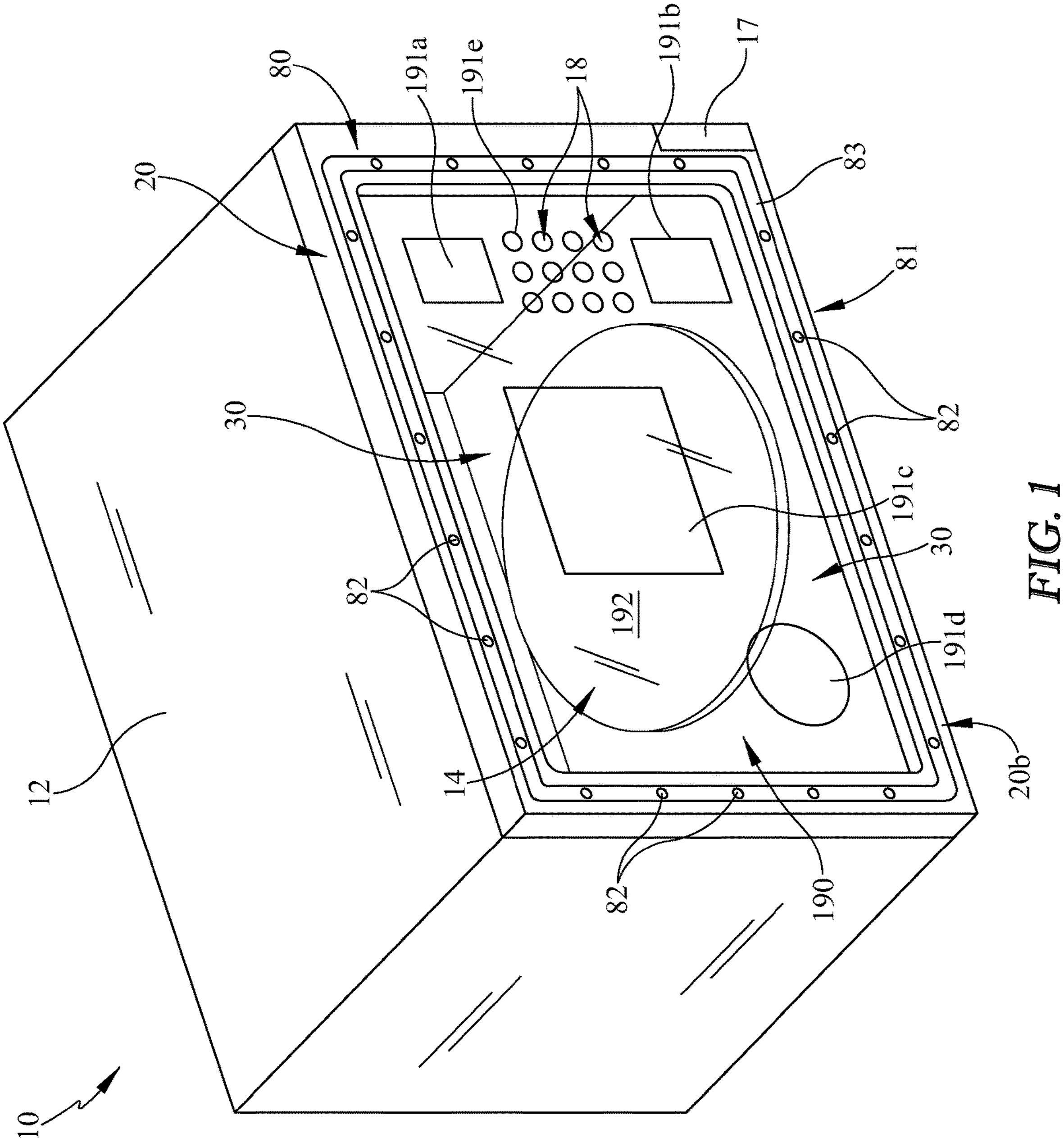
FIG. 1 is a perspective view of an embodiment of a microwave cooking appliance illustrating a door in the closed position and illustrating one embodiment of the leak detection device and the user interface display.
Figure 2:
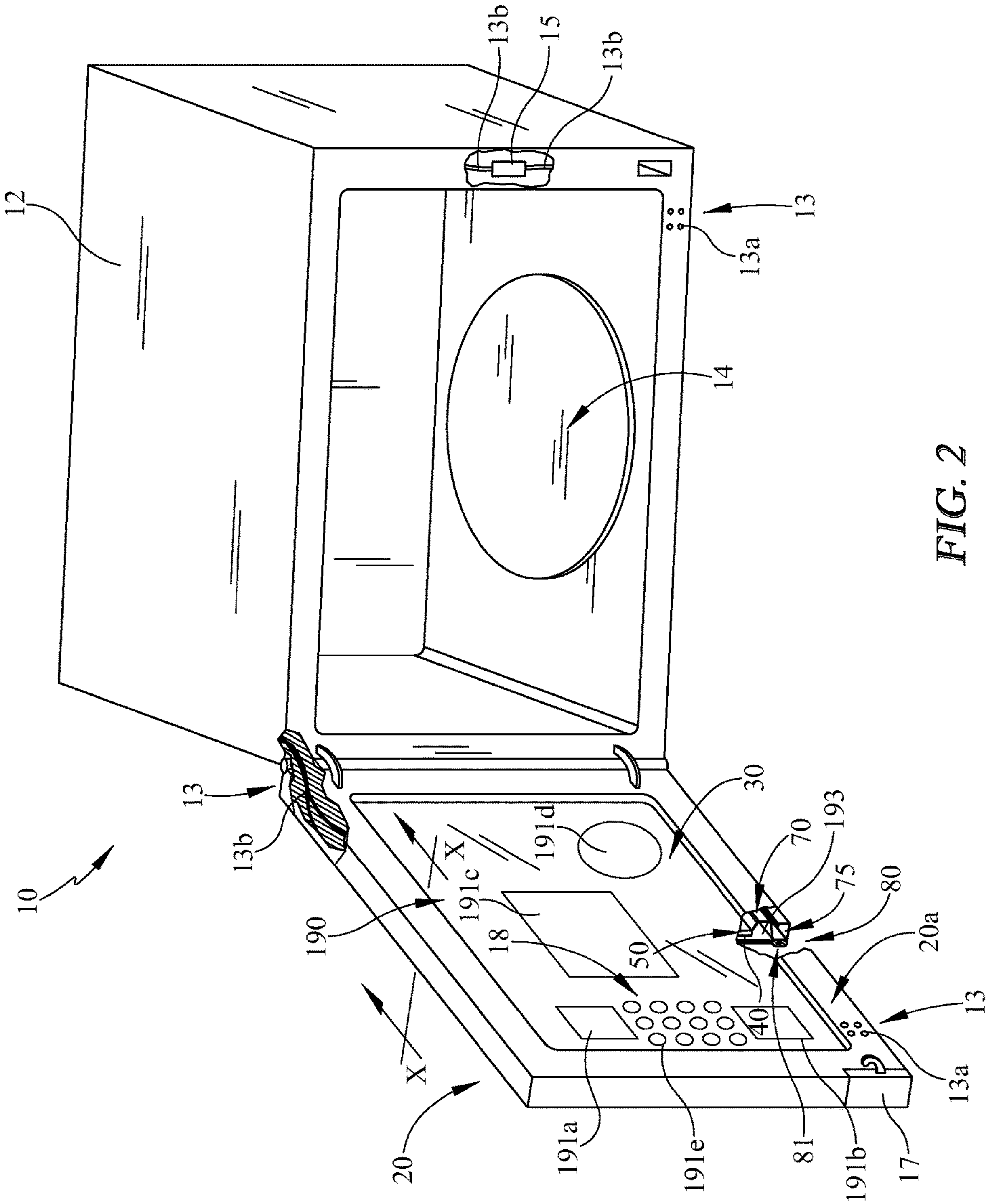
FIG. 2 is a perspective view of the microwave cooking appliance of FIG. 1 illustrating the door in the open position.

Turning now to the drawings, wherein like numbers denote like parts throughout the several views, FIGS. 1 and 2 illustrate an example microwave cooking appliance 10 in which the various technologies and techniques described herein may be implemented. Microwave cooking appliance 10 is a residential-type microwave cooking appliance, and as such includes a housing or enclosure 12, which further includes a cooking cavity 14, as well as a door 20 to form a portion of the cooking cavity 14. The door 20 may be disposed adjacent the respective opening of the cooking cavity 14. In various embodiments, the door 20 may include an interior side/face 20*a* and an exterior side/face 20*b*. In some embodiments, the door 20 may further includes one or more windows 30 from the exterior side/face 20*b* through the interior side/face 20*a* that allows a user to view the items inside the cooking cavity 14. In some embodiments, the door 20 and/or window 30, or portions thereof, may include one or more conductive mesh layers 40 and/or multi-layered shielding layers or panel 50, which are described in greater detailed herein. Although not shown, in various embodiments the door 20 may include a handle. In some embodiments, in place of, or in addition, to the handle, the microwave cooking appliance 10 may include a button 17 that a user may press to trigger the opening of the door 20.

The microwave cooking appliance 10 may also include one or more user activated controls 18, which may be in the form of buttons, knobs, a touchscreen, or the like. In some embodiments, these user activated controls 18 may be used to program a cooking time and/or a cooking power level. In addition, in some embodiments, these user activated controls 18 may be used to selected one or more preset conditions for a particular food item to be cooked or a particular desired action (e.g. "popcorn", "defrost", "frozen pizza", etc. The microwave cooking appliance 10 may also include a user interface display 190, which may be used to convey a variety of information to a user. For example, in some embodiments, the display 190 may be used to display the time when the microwave cooking appliance 10 is not in use. In other embodiments, the display 190 may be used to display cooking times, power levels and/or temperatures. In some embodiments, the window 30 may include the display 190 and/or controls 18.

In some implementations, the door 20, or portions thereof, may include a shielding material to contain microwaves while permitting light transmission to view inside the cooking cavity. In some embodiments, the door 20, or portion thereof, may have microwave leakages less than about 5 $mW/cm^2$. One embodiment of the shielding material may be a conductive mesh layer 40 and/or frame 70. The conductive mesh layer may be a microscopic layering of metal mesh. The window 30 or passageway/through opening 74 through the door 20 may include the conductive mesh layer 40 to view into the cooking cavity 14. One embodiment of the conductive mesh layer 40 may be nano-structures on one or more films (e.g. hard or soft surface). In some implementations, the nano-patterns on the film may be of a ROLLING MASK LITHOGRAPHY technology and/or NANOWEB nano-structure. The conductive mesh layer 40 may be a sub-micron, high transparency, and/or supper conductive. The conductive mesh layer 40 may have, but is not limited to, high transmission, high conductivity, lower haze, and/or high resolution/control. In some embodiments, the conductive mesh layer may be flexible, scalable, and/or transparent in optical and IR. In some embodiments, the conductive mesh layer 40 may have optical transmittance of at least 80%. In various embodiments, the conductive mesh layer 40 may have an EMI shielding effectiveness of about 30 dB to about 70 dB while maintaining optical transmittance of about 88% to about 99%.

Figure 3:
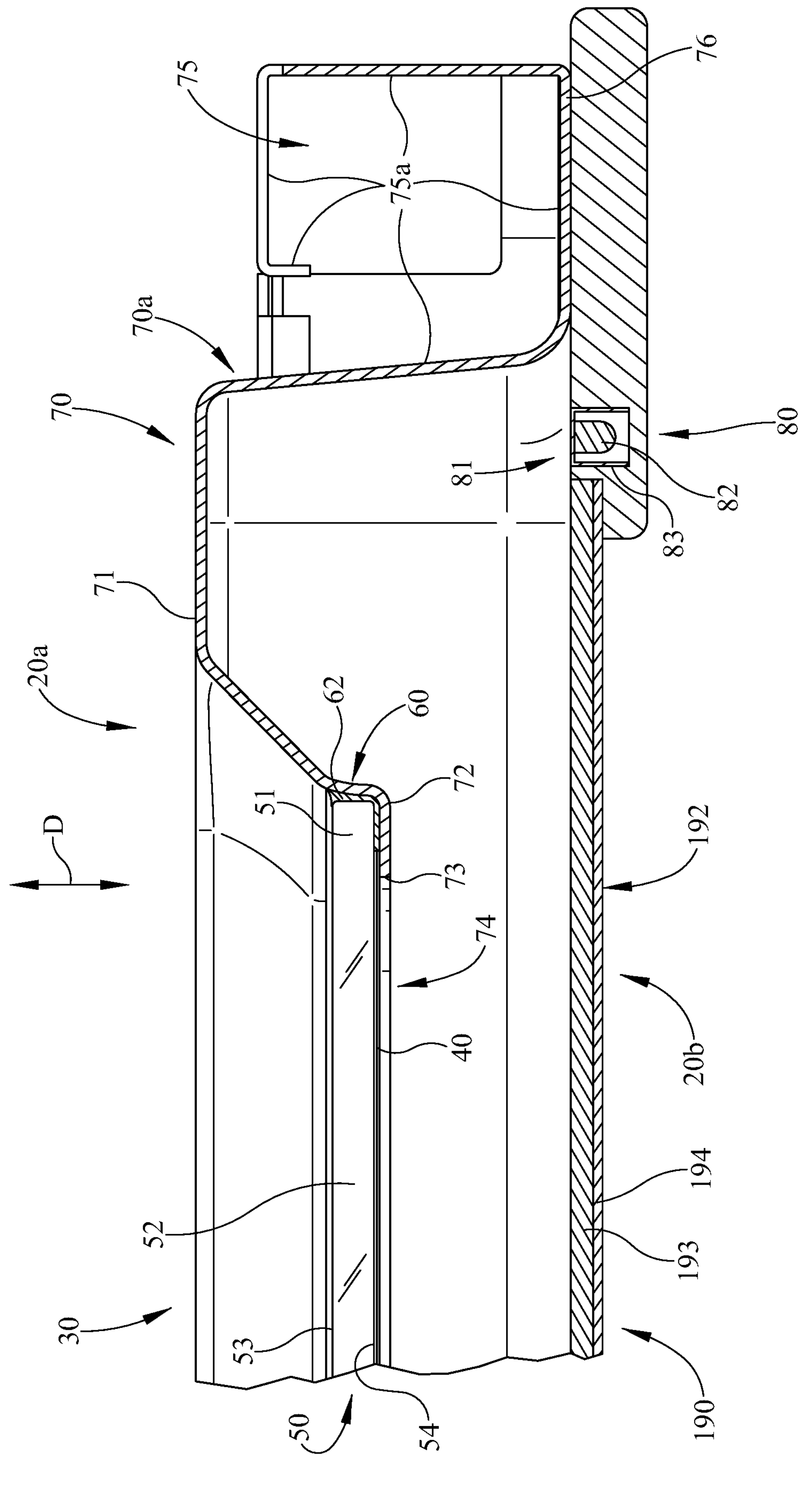
FIG. 3 is a sectional view of a door frame taken along line X-X of FIG. 2 illustrating one embodiment of a conductive mesh layer and a conductive engagement between the conductive mesh layer and the frame.
Figure 4:
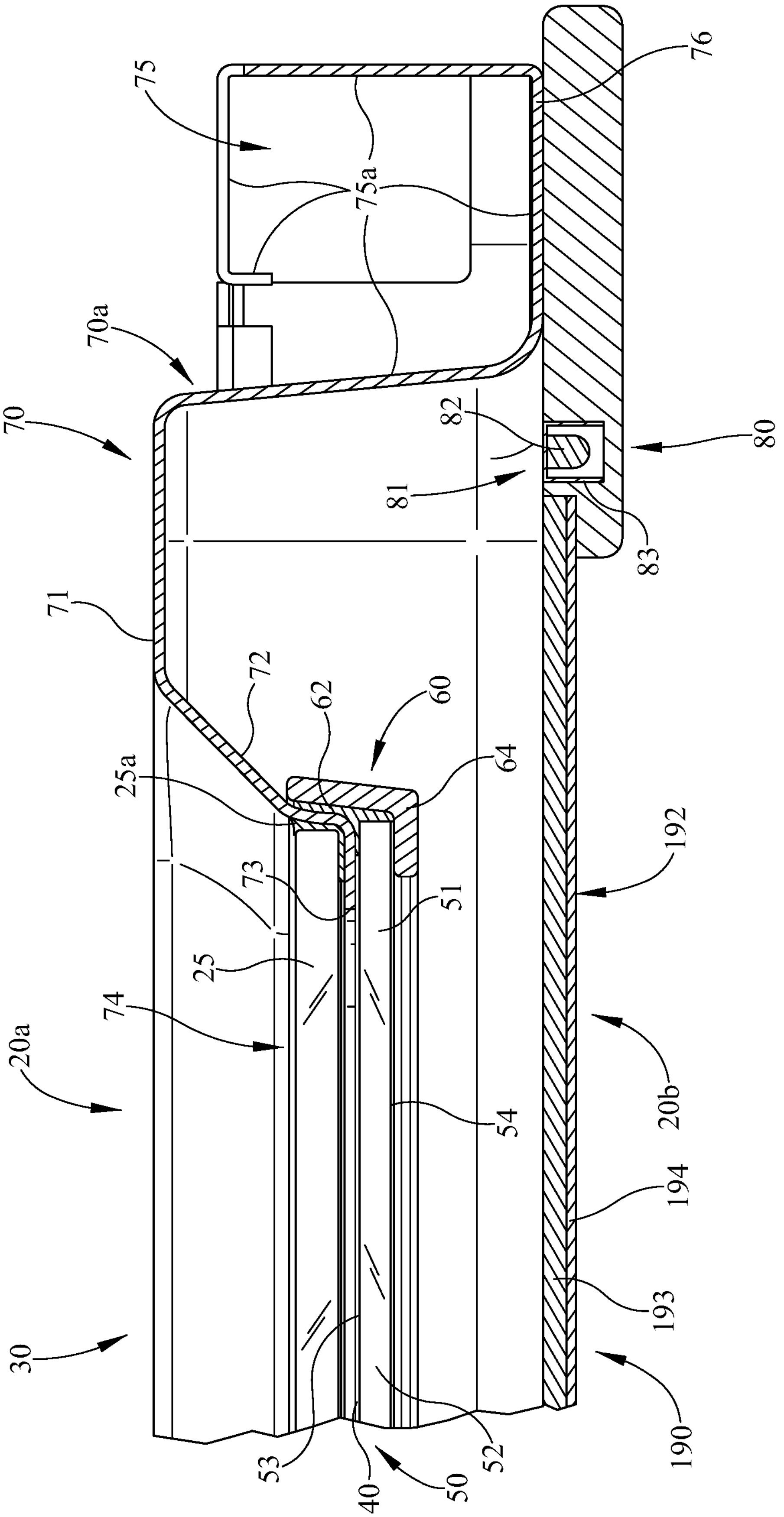
FIG. 4 is a sectional view of a door frame taken along line X-X of FIG. 2 illustrating another embodiment of a conductive mesh layer and a conductive engagement between the conductive mesh layer and the frame.
Figure 5:
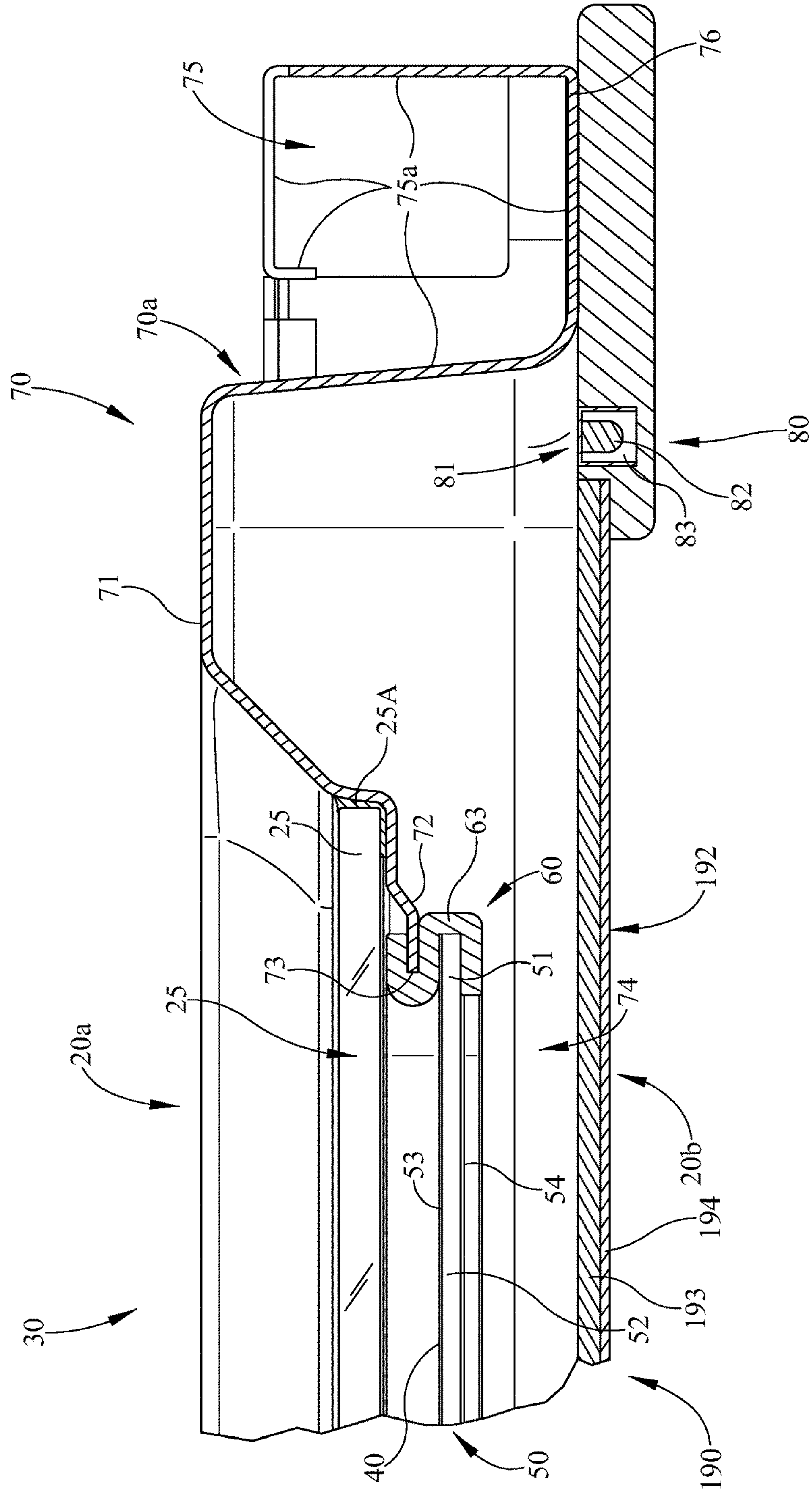
FIG. 5 is a sectional view of a door frame taken along line X-X of FIG. 2 illustrating another embodiment of a conductive mesh layer and a conductive engagement between the conductive mesh layer and the frame.
Figure 9:
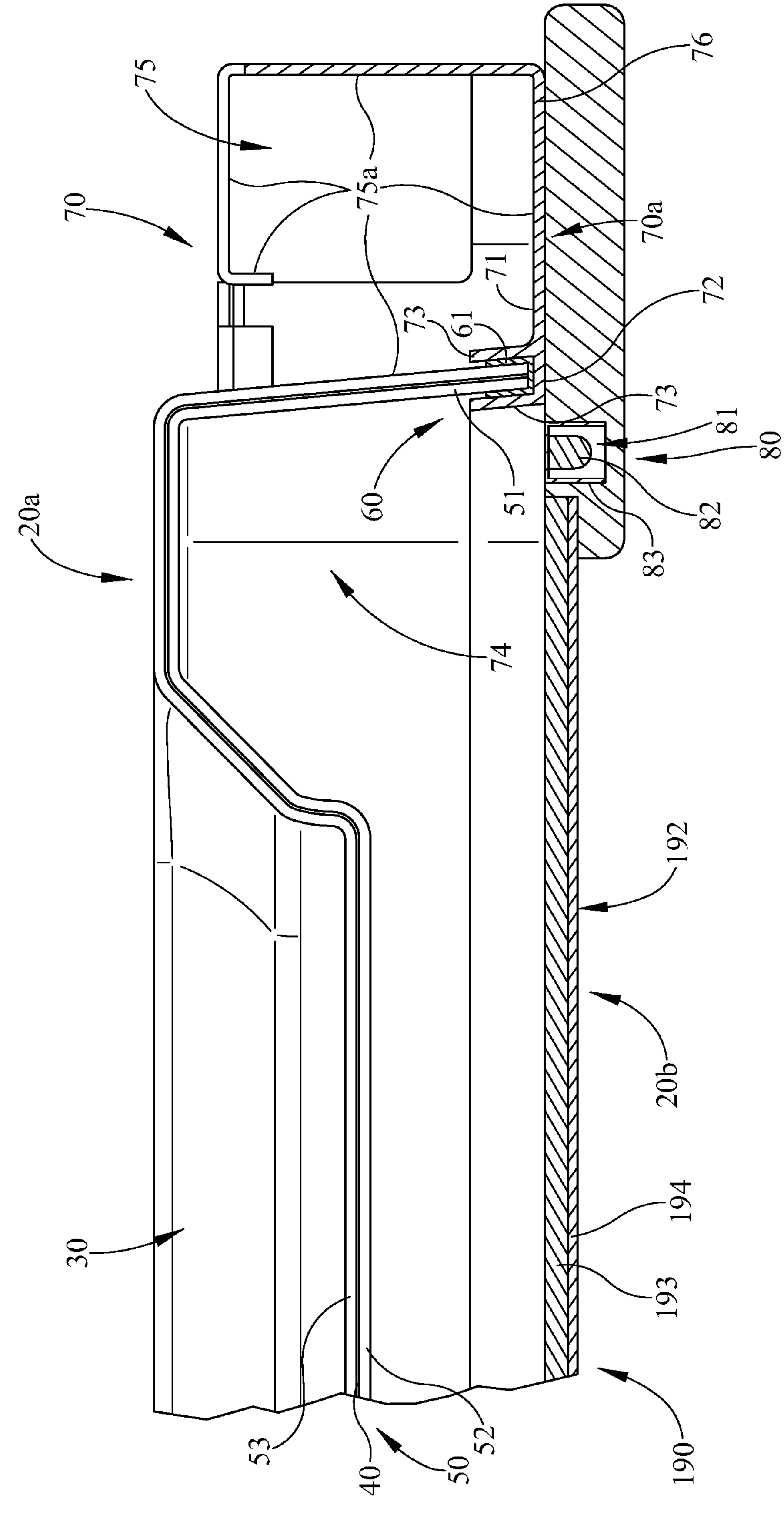
FIG. 9 is a sectional view of a door frame taken along line X-X of FIG. 2 illustrating another embodiment of a conductive mesh layer and a conductive engagement between the conductive mesh layer and the frame.
Figure 10:
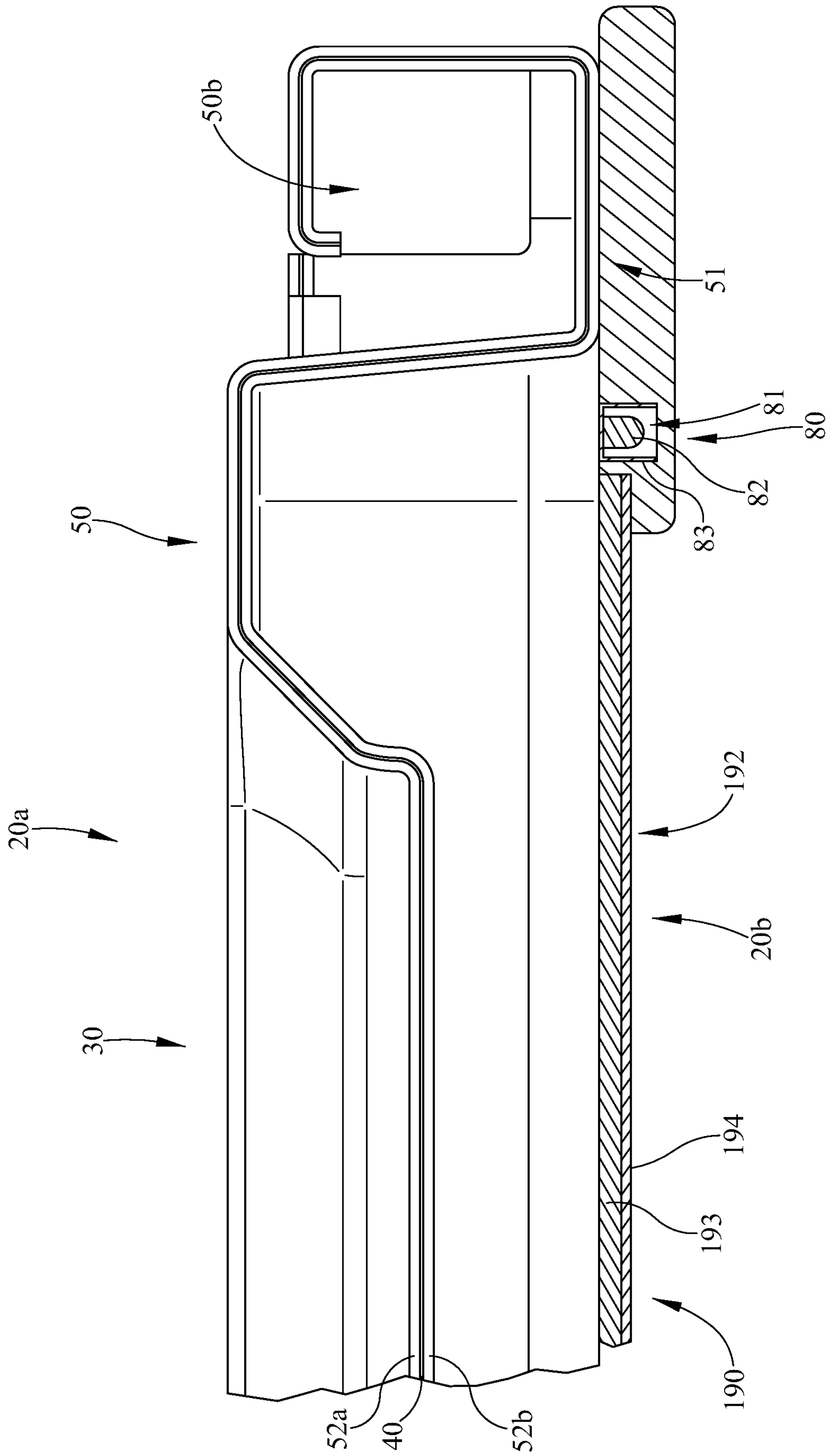
FIG. 10 is a sectional view of a door frame taken along line X-X of FIG. 2 illustrating another embodiment of a conductive mesh layer forming the frame.
Figure 11:
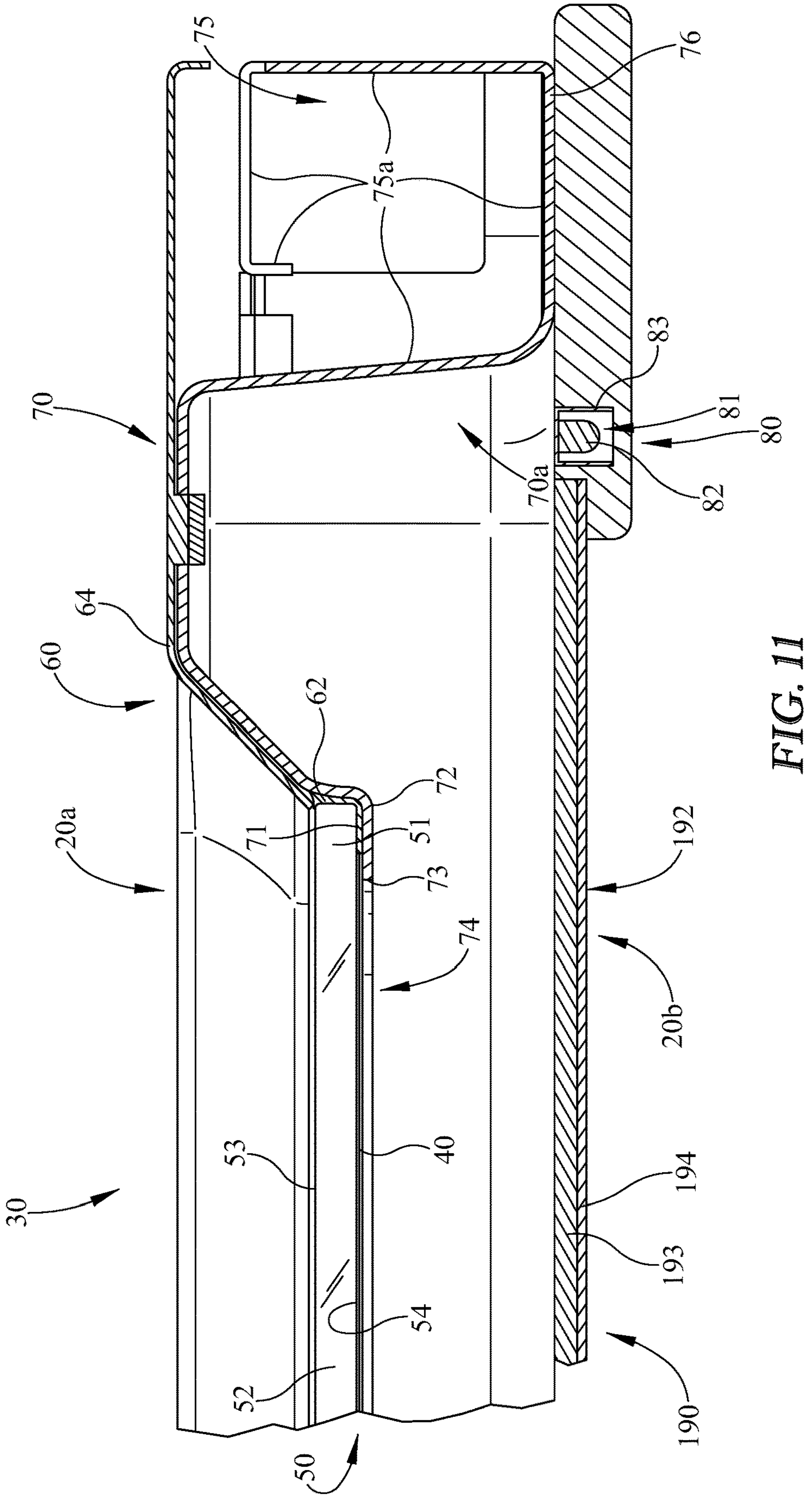
FIG. 11 is a sectional view of a door frame taken along line X-X of FIG. 2 illustrating another embodiment of a conductive mesh layer and a conductive engagement between the conductive mesh layer and the frame.

In some implementations, a multi-layered shielding panel 50 may include the one or more conductive mesh layers and/or films 40 and one or more clear layers 52 (e.g. glass, polycarbonate, etc.). In some embodiments, the conductive mesh layer 40 may be on one side (e.g. interior face 53 and/or exterior face 54) of a single clear or glass layer. In various embodiments, the conductive mesh layer 40 may be positioned or layered between two clear or glass layers 52 (e.g. inner glass layer 52*a* and outer glass layer 52*b*). The one or more layers 40, 52 of the panel 50 may be in a variety of positions in the direction D from an inward facing or interior side 20*a* of the door 20 facing the cooking cavity 14 towards the outward facing or exterior side 20*b* of the door 20 facing away from the cooking cavity 14. In some embodiments, as shown in FIGS. 4 and 5, the conductive mesh layer 40 may be on an interior face/side or inwardly facing side 53 of the clear layer 52 or panel 50. In other embodiments, as shown in FIGS. 3 and 11, the conductive mesh layer 40 may be on an exterior face/side or outwardly facing side 54 of the clear layer 52 or panel 50. In various embodiments, as shown in FIGS. 6, 7-10, and 12, the conductive mesh layer 40 may be positioned or layered between the inner glass layer 52*a* and the outer glass layer 52*b*. The multi-layered shielding panel, or portions thereof, may be a variety of sizes, shapes, quantities, materials, positions within the door/frame, and construction and still be within the scope of the invention.

In some implementations, one or more conductive engagements 60 may be included to at least electrical ground the multi-layered shielding panel 50 or conductive mesh layer 40 to a frame 70, or portions thereof, of the door 20. The conductive engagements may extend along the outer edge 51 of the panel or conductive mesh 40 and/or along the inner periphery 73 of the frame 70 to seal against leakage and/or attach the panel with the frame. The one or more conductive engagements 60 may be continuous and/or discontinuous about the panel, or portions thereof. The one or more conductive engagements 60 may couple the multi-layered shielding panel 50 or conductive mesh layer 40 to the frame 70 in a variety of methods, quantities, shapes, sizes, and constructions and still be within the scope of the invention.

Figure 6:
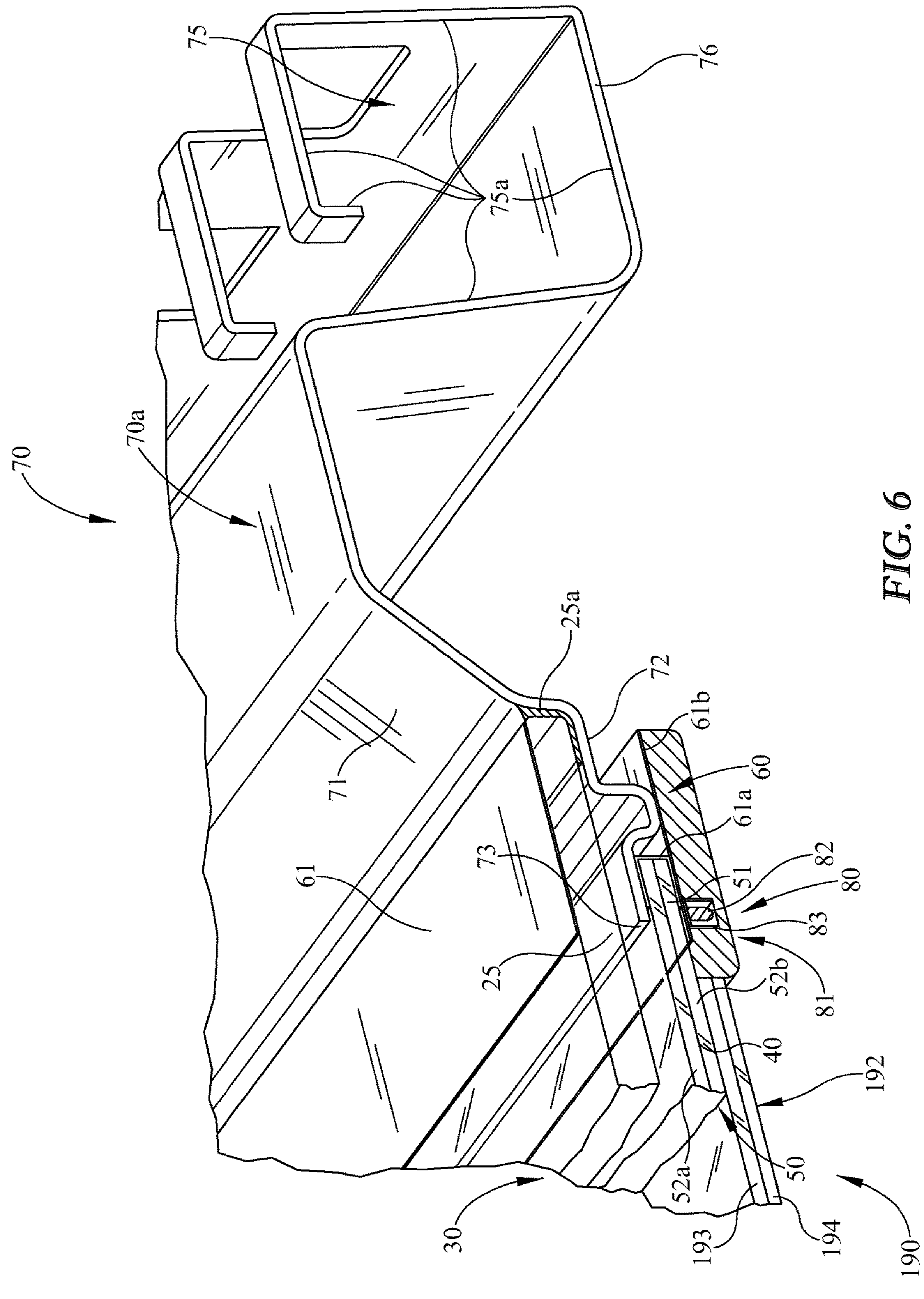
FIG. 6 is a perspective sectional view of a door frame taken along line X-X of FIG. 2 illustrating another embodiment of a conductive mesh layer and a conductive engagement between the conductive mesh layer and the frame.
Figure 7:
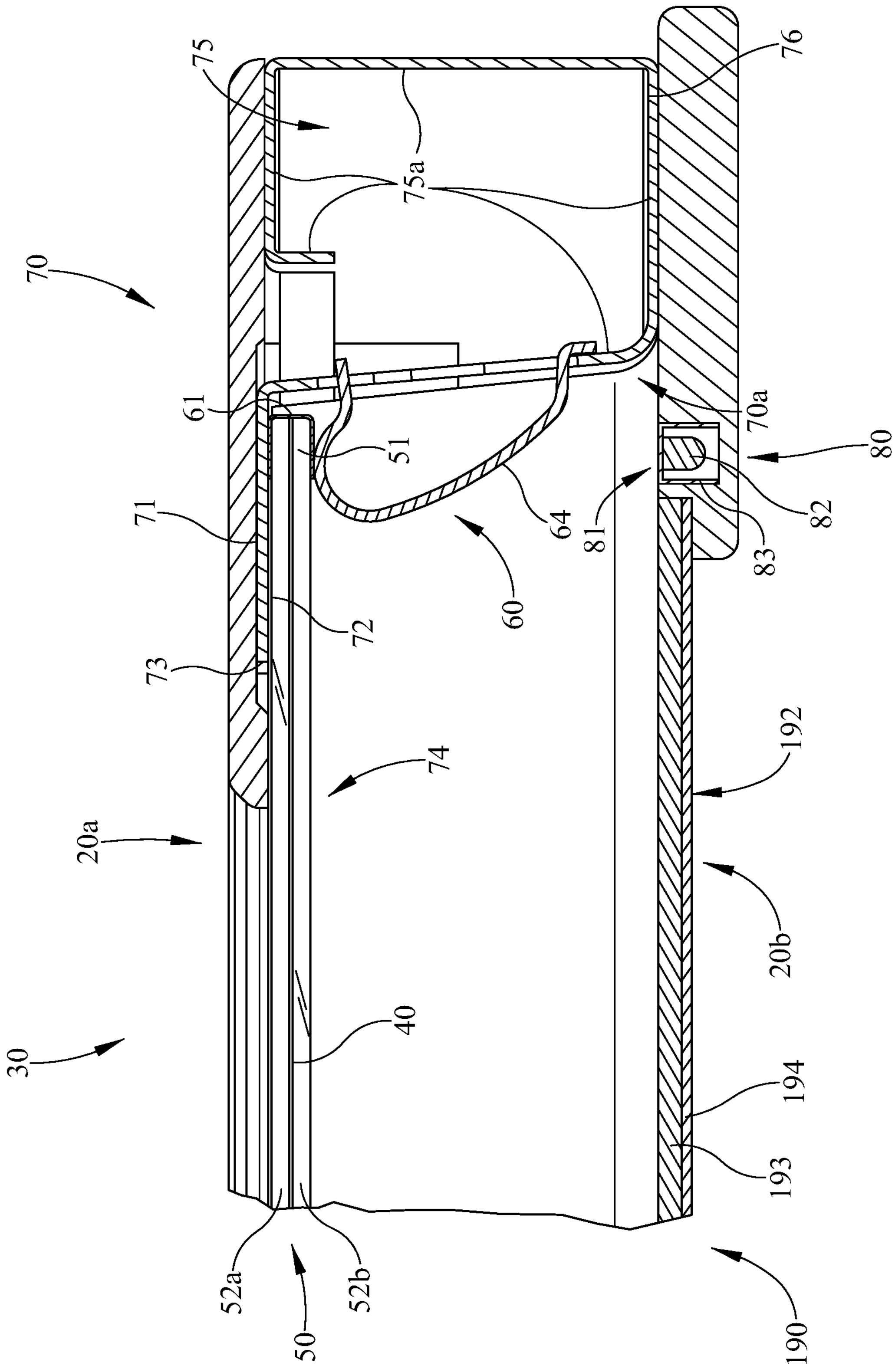
FIG. 7 is a sectional view of a door frame taken along line X-X of FIG. 2 illustrating another embodiment of a conductive mesh layer and a conductive engagement between the conductive mesh layer and the frame.

In some implementations, one embodiment of the conductive engagement 60 may be one or more conductive strips or tapes 61. In some embodiments, the multi-layered shielding panel 50 or conductive mesh layer 40 may include one or more conductive strips or tapes 61 (e.g. metal tape, KAPLON tape, etc.) in electrical communication (e.g. electrically grounded) with the conductive mesh layer 40. In some embodiments, as shown in FIGS. 6-9 and 12, the one or more conductive strips 61 (e.g. U-shaped slot receiving the panel edge or outer periphery 51) may engage or surround one 70, or more surfaces of (e.g. electrically and/or mechanically) an outer edge or outer periphery 51 of the panel 50 or mesh layer 40, or portions thereof. In some embodiments, as shown in FIG. 6, the conductive tape 61 may mechanically engage and/or electrically ground the multi-layered panel 50 or mesh layer 40 to the metal frame or other portions of the door 20 (e.g. directly or indirectly through additional conductive structure 60, 61). The tape 61, and/or other conductive engagements, may extend around the entire periphery or perimeter of the panel/mesh to engage the portion of the frame. In various embodiments, as shown in FIG. 6 a first conductive tape 61*a* may engage (e.g. electrically ground) the mesh layer 40 or panel 50 and a second conductive tape 61*b* may engage the metal frame, or other portions of the door, with the first conductive tape 61*a*.

In some implementations, one embodiment of the conductive engagement 60 may be one or more conductive adhesives or sealants 62. In some embodiments, the multi-layered shielding panel 50 or conductive mesh layer 40 may include one or more conductive adhesives or sealants 62

(e.g. conductive glass sealant) in electrical communication (e.g. electrically grounded) with the conductive mesh layer 40. In some embodiments, the one or more conductive adhesive 62 may engage or surround one or more surfaces of (e.g. electrically and/or mechanically) the outer edge or periphery 51 of the panel 50 or mesh layer, or portions thereof. In some embodiments, as shown in FIGS. 3, 4, and 9, the conductive adhesive 62 may engage and/or electrically ground the multi-layered panel or mesh layer to the metal frame 70, or other portions of the door (e.g. directly or indirectly through one or more additional conductive structures).

Figure 8:
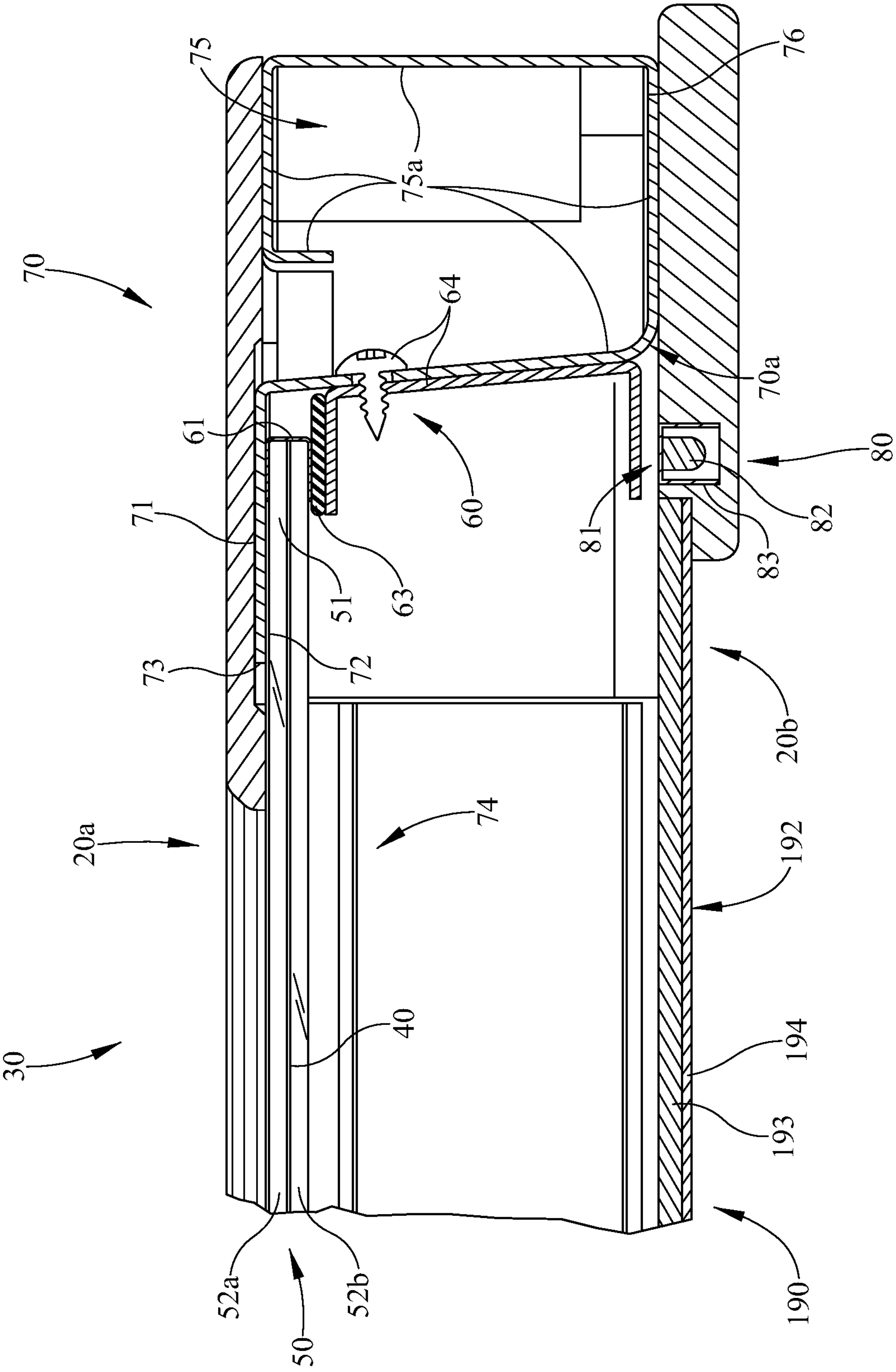
FIG. 8 is a sectional view of a door frame taken along line X-X of FIG. 2 illustrating another embodiment of a conductive mesh layer and a conductive engagement between the conductive mesh layer and the frame.

In some implementations, one embodiment of the conductive engagement 60 may be one or more conductive gaskets 63. In some embodiments, the multi-layered shielding panel 50 or conductive mesh layer 40 may include one or more conductive gaskets 63 in electrical communication (e.g. electrically grounded) with the conductive mesh layer 40. In some embodiments, the one or more conductive gaskets 63 may engage (e.g. electrically and/or mechanically) an outer edge 51 of the panel 50 or mesh layer 40, or portions thereof. In some embodiments, as shown in FIGS. 5 and 8, the conductive gasket 63 may mechanically engage and/or electrically ground the multi-layered panel 50 or mesh layer 40 to the metal frame 70, or other portions of the door 20 (e.g. directly or indirectly through additional conductive structure). As shown in FIG. 5, a conductive gasket 63 (e.g. S-shaped) may be used to directly engage (e.g. electrically and/or mechanically) the mesh layer to the frame, or portions thereof.

In some implementations, one embodiment of the conductive engagement 60 may be one or more conductive fasteners 64. In some embodiments, the multi-layered shielding panel 50 or conductive mesh layer 40 may include one or more conductive fasteners 64 (e.g. mechanical) in electrical communication (e.g. electrically grounded) with the conductive mesh layer 40. In some embodiments, the one or more conductive fasteners 64 may engage (e.g. electrically and/or mechanically) the outer edge 51 of the panel 50 or mesh layer 40, or portions thereof. In some embodiments, as shown in FIGS. 4, 7, 8, and 11, the conductive mechanical fastener 64 may mechanically engage and/or electrically ground the multi-layered panel 50 or mesh layer 40 to the metal frame 70, or other portions of the door 20 (e.g. directly or indirectly through one or more additional conductive structures). As shown in FIGS. 4, 7, 8, and 11, the one or more conductive fasteners 64 may be a mechanical clip releasably engaging the panel 50 and/or mesh layer 40 to the frame (e.g. inner periphery 73, interior surface 71, exterior surface 72, etc.). As shown in the one embodiment in FIG. 7, the one or more conductive fasteners or mechanical clip 64 may be one or more metal or spring clips releasably engaging the panel 50 and/or mesh layer 40 to the frame 70 (e.g. inner periphery, exterior surface 72, interior surface 71). As shown in the one embodiment in FIG. 8, the one or more fasteners or mechanical clip 64 may be one or more metal clips/brackets and/or one or more screws/fasteners releasably engaging the panel 50 and/or mesh 40 to the frame 70 (e.g. inner periphery, exterior surface 72, body, interior surface 71). As shown in the one embodiment in FIG. 11, the one or more fasteners or mechanical clips 64 may be an interior shroud releasably engaging the panel 50 and/or mesh 40 to the frame 70 (e.g. inner periphery, interior surface).

It should be understood that one or more of the conductive and/or sealing engagements 60, if used, may be used alone or in combination with another one or more conductive engagements 60 and/or nonconductive engagements to position (e.g. electrically, adhesively, and/or mechanically) the multi-layered shielding panel 50 and/or conductive mesh layer 40 with one or more portions of the door 20 or frame 70. As shown in the Figures, a variety of conductive and/or sealing engagements 60, if used, may be included in the door 20 in some embodiments. For example, in FIG. 6, a plurality of conductive tape 61 (e.g. 61*a* and 61*b*) may be used. In some embodiments, a conductive gasket, sealant, and/or tape may be used together. In some embodiments, as shown in FIG. 4, a sealant 62 and clip 64 may be used. In another example, in FIG. 7, a conductive tape 61 and spring clip 64 may be used. In other embodiments, as shown in FIG. 8, conductive tape 61, conductive gasket 63, and a conductive fastener 64 may be used. It should be understood that the engagements 60 (e.g. electrical, mechanical, and/or adhesive) of the multi-layered shielding layer 50 and/or mesh layer 40 may be a variety of sizes, shapes, materials, positions, quantities, and constructions with the door (e.g. frame), or portions thereof, and still be within the scope of the invention.

In some implementations, the door 20, or portions thereof, may include a variety of frames 70 (e.g. metal). In some embodiments, the frame 70 may include a body 70*a* having an inner periphery 73 defining at least a portion of the window 30 and an outer periphery 76. An interior surface 71 of the body 70*a* may face towards the cooking cavity 14 and an exterior surface 72 of the body 70*a* may face away from the cooking cavity 14. In some embodiments, the frame 70 may include a choke groove 75 adjacent the outer periphery 76. The choke groove 75 may capture microwaves (e.g. leakage rate less than 5 $mW/cm^2$ at a distance of 5 cm) or shield microwave leakage along with the panel 50 and/or mesh layer 40. The choke groove 75 may be positioned along the outer periphery 76 of the frame. The inner periphery 73 may define the through opening 74 through the frame 70. At least a portion of the conductive mesh layer 40 and/or panel 50 is disposed/extends over or across the through opening 74 and is electrically ground and attached to the frame 70. In some embodiments, the panel 50/layer 40, or portions thereof, may overlap a portion of the frame, or portions thereof.

Figure 12:
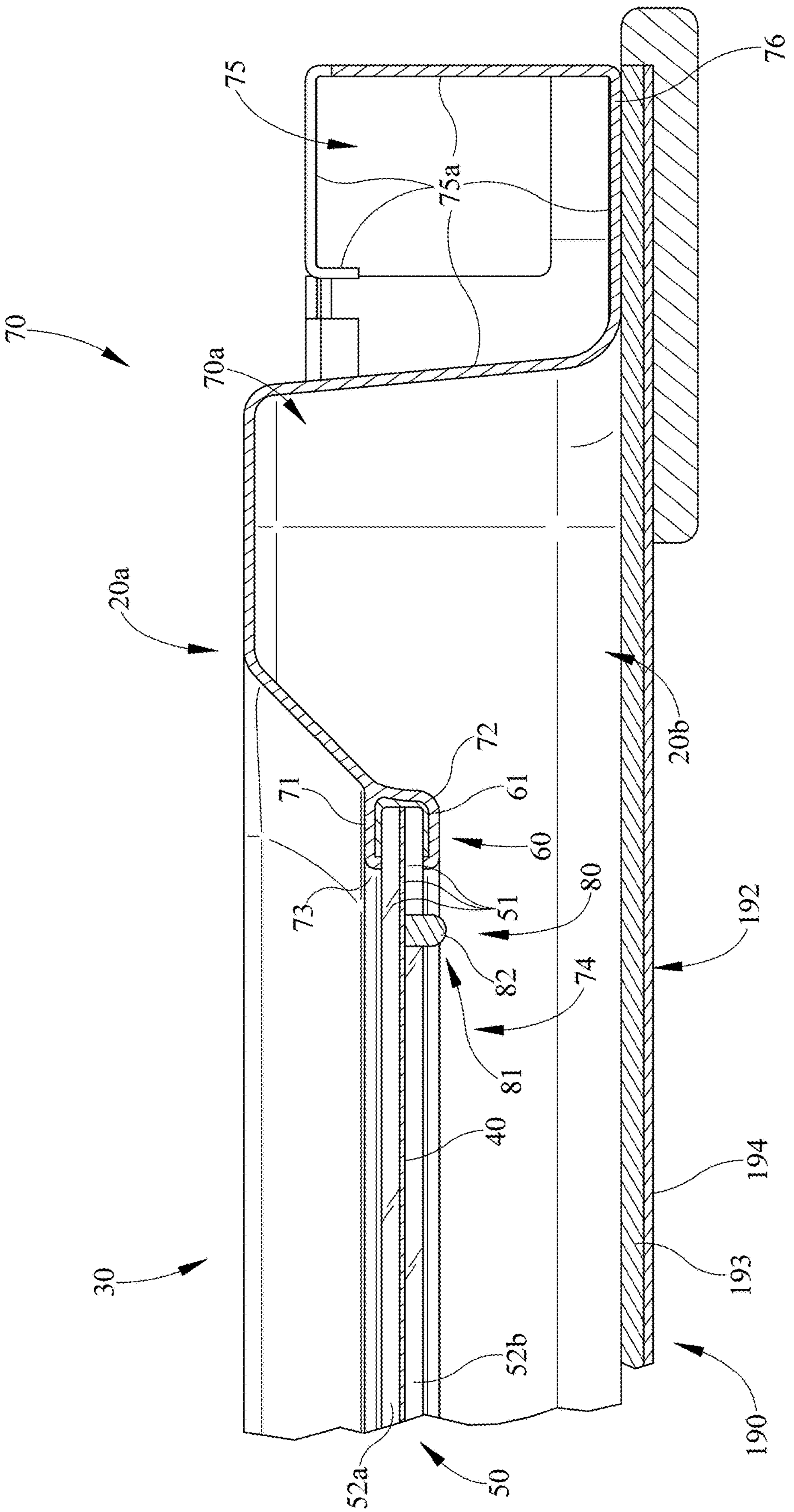
FIG. 12 is a sectional view of a door frame taken along line X-X of FIG. 2 illustrating another embodiment of a conductive mesh layer and a conductive engagement between the conductive mesh layer and the frame.

In some implementations, the frame 70, or portions thereof, supports or is coupled (e.g. electrically, mechanically, and/or adhesively) to the conductive mesh layer 40 and/or multi-layered shielding panel 50. This coupling may be from one or more conductive engagements 60 (e.g. 61, 62, 63, and/or 64) and/or nonconductive engagements. As shown in FIGS. 3, 9, 11, and 12, the panel 50 and/or conductive mesh layer 40 may be positioned on the interior surface 71 of the frame body 70*a* adjacent an inner periphery 73 defining the through opening 74. As shown in FIGS. 4-9 and 12, the panel 50 and/or conductive mesh layer 40 may be positioned on an exterior surface 72 of the frame body 70*a* adjacent the inner periphery 73 defining the through opening 74. In some embodiments as shown in FIGS. 9 and 10, the panel 50 and/or conductive mesh layer 40 may be or define a portion of the choke groove 75, or one or more walls 75*a*, of the frame 70. In some embodiments, the inner periphery 73 of the frame 70 may be adjacent to or define one or more portions of the choke groove 75 wherein the mesh layer 40 and/or panel 50 may define the remaining portion of the choke groove 75. It should be understood that the frame 70 may support or couple the conductive wire mesh and/or panel in a variety of ways, methods, and constructions and still be electrically grounded to the frame. For example, as shown in FIG. 12, the panel 50 and/or conductive mesh layer 40 may be molded to the frame 70 (e.g. frame made of a conductive plastic material), or portions thereof. Moreover, nonconductive engagements may be included to support the panel in some embodiments. If used, the frame, or portions thereof, may be a variety of materials, quantities, shapes, sizes, and constructions and still be with the scope of the invention.

In some implementations, the conductive mesh layer 40 and/or multi-layered shielding panel 50 may be formed to be substantially the entire frame. As shown in FIG. 10, the multi-layered panel 50 may be formed without a metal frame portion. The panel and/or conductive mesh may include an outer periphery 51 with a choke groove 50*b* as shown in the one embodiment in FIG. 10.

In some embodiments, the door may include one or more protective layers 25 (e.g. glass) interior and/or exterior to the conductive mesh layer or panel. In various embodiments, the protective glass layers 25 may be spaced away from the panel and/or mesh layer towards and/or away from the cooking cavity 14 in the window 30. The protective layers 25 may reduce unwanted contact with portions of the door, interior panel 50, and/or mesh layer 40. The one or more protective layers 25 may be on one or more opposing sides of the panel 50. A variety of tapes, sealants, and/or gaskets may be used to attach the protective layer with the door/frame, or portions thereof.

In some implementations, a leak detection device or apparatus 80 may be used to detect microwaves undesirably escaping from the microwave oven cooking cavity 14. The leak detection device 80 may be used to alert the consumer or user in proximity to the microwave cooking appliance 10 and/or remotely to another device (e.g. tablet, phone, etc.). The leak detection device 80 may be activated by the microwaves escaping from the cavity (e.g. through portions of the door and/or around the perimeter of the door). For example, in some embodiments, the microwaves or microwave energy may escape away from or adjacent to at least the frame 70 and/or mesh layer 40, or portions of the door 20.

In some embodiments, the leak detection device 80, if used, may include one or more light sources 81. The one or more light sources may be activated if the microwaves or microwave energy escape from the cavity (e.g. conductive and/or sealing engagements 60). The light sources 81 may be configured to be in an off configuration and do not illuminate when there are no microwaves present or escaping, or one or more threshold amounts (e.g. predetermined) of microwaves has not been reached. The one or more light sources 81 may be in an on configuration and illuminate when the microwaves are present or escaping one or more portions of the door/housing, or the one or more threshold amounts (e.g. predetermined) of microwaves has been reached. In some implementations, one or more light sources 81 may be in the on configuration adjacent to and/or distal from the leakage or microwaves escaping. For example, in the embodiments shown in the Figures, the one or more light sources 81 may illuminate when in the on configuration adjacent to the escaping microwaves or the light sources are adjacent thereto. Alternatively, the leak detection device does not have to be activated directly by the microwaves as in the present embodiment. The one or more light sources may be distal from the leakage and be configured to receive a signal or be activated remotely from the leakage, therefore not powered from the microwaves. It should be understood that the light sources, if used, of the leak detection device may be a variety of sizes, shapes, materials, constructions, quantities, and positions with the door (e.g. frame, mesh layer, etc.), or portions thereof, and still be within the scope of the invention. For example in the one embodiment shown, the light sources may include LEDs.

In some implementations, the one or more light sources or leak detection device, if used, may be one or more LEDs 82. The LEDs 82 may be positioned in a variety of positions within the door 20. In some embodiments, the LEDs may be positioned in the door of the microwave appliance as shown. Alternatively, the LEDs or light source may be positioned within the housing and/or door. In various embodiments as shown in the Figures, if a light source 81 is used, the one or more light sources or LEDs may be positioned in an annular pattern or be annularly spaced within the door (e.g. exterior side 20*b* of the door 20). The annular pattern of the LEDs 82 may be rectangular in shape having one or more sides about the window 30 or through opening 74. As shown in the one embodiment in FIGS. 1-12, the one or more LEDs may be positioned or embedded in a plastic piece or strip 83. In some embodiments as shown in FIG. 12, the LEDs 82 may not be embedded in a strip in the exterior side 20*b* of the door. For example, the one or more LEDs may be embedded, in contact with, or positioned adjacent the mesh layer 40, or other portions of the panel 50 or door.

The light source or leak detection device may be in a variety of positions and still be within the scope of the invention. The one or more light sources 81 or leak detection device 80 may be in a variety of positions transverse to the direction D, from an inward facing or interior side 20*a* of the door 20 facing the cooking cavity 14 towards the outward facing or exterior side 20*b* of the door 20 facing away from the cooking cavity 14. As shown in the one embodiment, the one or more light sources 81 may be spaced inwardly from the perimeter or seal/engagement of the door 20 to the housing 12 (e.g. area surrounding the opening/cavity to insert or remove food). As shown in FIGS. 6-8, 9, and 12, the one or more light sources 81 or leak detection device 80 may be adjacent to the inner periphery 73 and/or through opening 74 of the frame 70. In some embodiments, as shown in FIGS. 6-8, 9, and 12, the leak detection device 80 or LEDs 82 may be adjacent the conductive engagement 60 between the mesh layer 40 and the frame 70. If no frame is used, for example in FIG. 10, the LEDs 82 may be positioned at a variety of locations relative to the plane of the mesh layer 40, or portions thereof. The leak detection device or LEDs may be positioned adjacent the outer periphery 57 of the mesh layer or panel 50 in some embodiments. For example, as shown in FIG. 10, the LEDs may be positioned interior of the choke 51 or adjacent the outer periphery 57 of the panel 50, or portions thereof. The one or more light sources may be spaced inwardly from the choke, spaced outwardly from the choke, or alternately adjacent to the choke. In some embodiments, as shown in FIGS. 3-5 and 11, the light source 81 or LEDs 82 may be positioned or spaced outwardly from the conductive engagement 60, through opening 74, mesh layer 40, window 30, and/or panel 50.

The one or more light sources or leak detection device may be in a variety of positions in the direction D from an inward facing or interior side 20*a* of the door 20 facing the cooking cavity 14 towards the outward facing or exterior side 20*b* of the door 20 facing away from the cooking cavity 14. The LEDs or leak detection device may be on the exterior side 20*b* of the door. As shown in the embodiments in FIGS. 1-11, the LEDs 82 or light source 81 may be spaced away from or outwardly from the mesh layer 40, frame 70, conductive engagements 60, or panel 50, or portions thereof. In some embodiments, the light source (e.g. LEDs) may be adjacent to, contact, or be embedded in one or more of the wire mesh layer 40, one or more glass layers 52 of the panel 50, one or more of the conductive engagements 60, choke 51, user interface display 190, and/or protective layers 25. As shown in the one embodiment in FIG. 12, the one or more light sources 81 (e.g. LEDs) may contact the wire mesh layer 40 at one or more positions.

It should be understood that the leak detection device, if used, of the multi-layered shielding panel 50, frame 70, door 20, and/or mesh layer 40 may be a variety of sizes, shapes, materials, positions, quantities, and constructions with the door (e.g. frame, mesh layer, conductive engagements, etc.), or portions thereof, and still be within the scope of the invention.

In some implementations, the microwave cooking appliance 10 or portions thereof (e.g. door) may include one or more user interface displays 190 (e.g. panel, layer, screen, film, etc.). The user interface display 190 may be used to present and/or receive (e.g. electronic, verbal, audio, visual, etc.) content 191*a-e* such as, but is not limited to, food characteristics (e.g. before, during, and/or after cooking), controls 18, cooking functions, nutritional value, allergy information, advertisements, recipe information, visual/audio media, information, timer, clock, moisture readings, cooking cavity conditions, alerts, leak detection 80, communication, etc. The user interface display 190 may be transparent in one or more applications, continuously or discontinuously. The user interface display 190 may be transparent or in a transparent configuration (e.g. when door is open/closed) to allow a consumer to see through the door 20/window 30 and/or into the cooking cavity 14 and view the contents therein. The content (e.g. food, etc.), or portions thereof, may be visible through the window 30 or portions of the door 20 when the door is in the open positon and/or closed position. The window 30, through opening 74, or portions of the door 20 may allow the consumer to see through at least the user interface display 190, mesh layer 40, multi-layered shielding panel 50, protective layer 25, and/or other portions of the door into the cavity 14. Alternately, the transparent user interface display 190 may become opaque (e.g. temporarily and/or predetermined) or placed in an opaque configuration to reduce the visibility through the door/window (e.g. when open and/or closed). It should be understood that the user interface display, if used, may be a variety of content, sizes, shapes, materials, positions, quantities, and constructions with the door (e.g. frame, mesh layer, conductive engagements, window, leak detection, etc.), or portions thereof, and still be within the scope of the invention.

In some embodiments as shown in the Figures, the user interface display 190 or portions thereof may include one or more touch screens 192 or be touch-sensitive. One or more users can touch the touch screen 192, if used, to present, operate, receive, access, or manage input/output or the content 191*a-e* (e.g. controls 18) as described above. The content 191*a-e* may be added or removed from the user interface display 190 in some embodiments. It should be understood that the touch screen, if used, of the user interface display may be a variety of sizes, shapes, materials, positions, quantities, and constructions with the door (e.g. frame, mesh layer, conductive engagements, etc.), or portions thereof, and still be within the scope of the invention.

In some implementations as shown in FIGS. 1 and 2, the door 20, or portions thereof, may include one or more of the controls 18 of the microwave cooking appliance. The user interface display 190 or touch screen 192 may include one or more of the controls 18 to operate one or more characteristics/functions of the microwave cooking appliance 10. The one or more controls and/or touch screen may be configured to receive input from the user.

In some embodiments, the content 191*a-e* or portions of the user interface display 190 (e.g. touch screen 192) may be fixed and/or movable between one or more positons across the panel 193 or surface area. The layout of the touch screen 192 or user interface display 190 may be adjustable and/or fixed. The user may move content or controls 18 between positons on all or part of the touch screen and/or user interface display. The user may hide or show one or more of the contents/controls on the user interface display. One or more contents 191*a-e* may be presented for one or more predetermined times or a variety of times at one or more portions or all of the display/surface.

In some embodiments, the user interface display 190 may include a panel 193 (e.g. transparent). The panel 193 may include one or more layers. The user interface display 190 (e.g. panel 193) may be positioned on the exterior side 20*b* of the door 20 in the direction D away from the cooking cavity 14, mesh layer 40, panel 50, and/or frame 70. The user interface display is shown in the Figures as spaced away from the multi-layered shielding panel 50 and/or frame 70, or portions thereof, however the one of more portions of the user interface display may be adjacent thereto. The user interface display, or portions thereof, may be disposed in the window 30 of the door, or portions thereof. The user interface display or portions thereof may be disposed over the conductive mesh layer 40, or portions thereof. In some embodiments, the user interface display or portions thereof may be disposed over the frame 70, choke 75, multi-layered shielding panel 50, through opening 74, conductive engagement 60, or portions of the door. The one or more layers of the panel 193 may be made from glass, plexiglass, or other transparent or substantially transparent material. For example, the panel may be an LCD, LED, or OLED panel. Moreover, the panel 193 may be a single layer or a multi-layered structure.

In some implementations, the user interface display 190 or panel 193 may also include one or more additional layers, if used, on one or more sides thereof in the direction D. As shown in the FIGS. 3-12, one or more front layers or outer protective layers 194, if used, may be on the exterior side of the user interface display or panel 193. The outer protective layer 194, if used, may protect the user interface display panel 193 or touch screen 192. Although not shown, one or more rear panels or inner protective layers may be positioned between the user interface panel 193 and the cooking cavity 14. One or more portions of the outer and/or inner protective layers, if used, may be made from glass (e.g. insulated, tempered, etc.), plastics, or other transparent or substantially transparent material. The outer and/or inner protective layers may protect the panel 193 from impact/moisture damage.

In some embodiments, the microwave cooking appliance 10 may include a variety of connections 13 in communication with the user interface display 190 and/or leak detection 80. As shown in the one embodiment in FIG. 2, the user interface display may be powered and/or connected by one or more contact pins 13*a* to one or more portions or components of the appliance 10. The door 20 may include one or more contact pins 13*a* that correspond to one or more contact pins 13*a* with the remaining portion of the housing 14. When the door 20 is in the closed position (FIG. 1), the one or more contact pins 13*a* of the door 20 and remaining portion of the housing 12 engage each other to enable communication between the appliance, or portions thereof. When the door is in the open position (FIG. 2), the one or more contact pins 13*a* are disengaged from each other and may place one or more components of the appliance out of communication with each other. In some embodiments, one or more wires 13*b*, if used, may connect the user interface display 190 and/or leak detection 80 alone or in combination with the contact pin engagement, if used. Although the one or more wires 13*b* are shown as passing through the hinge of the door 20, the one or more wires may not pass through the door hinge in various embodiments.

A microwave cooking appliance 10 consistent with the invention also may include one or more controllers 15 configured to control the cooking cavity 14 and otherwise perform cooking operations at the direction of a user. In addition, as will become more apparent below, a controller 15 of a cooking appliance in some embodiments may also be configured to detect leakage of microwaves (e.g., via leak detection 80 and/or light source 81) and/or control the user interface display 190 (e.g. content 191*a-e* and/or controls 18, etc.), or portions thereof.

Controller 15 may receive inputs from a number of components and drives a number of components in response thereto. Controller 15 may, for example, include one or more processors and a memory within which may be stored program code for execution by the one or more processors. The memory may be embedded in controller, but may also be considered to include volatile and/or non-volatile memories, cache memories, flash memories, programmable read-only memories, read-only memories, etc., as well as memory storage physically located elsewhere from controller 15, e.g., in a mass storage device or on a remote computer interfaced with controller 15.

Controller 15 may be interfaced with various components, including cooking cavity 14 used for cooking food (e.g. microwave), one or more user controls 18 for receiving user input (e.g. various combinations of switches, knobs, buttons, sliders, touchscreens or touch-sensitive displays, microphones or audio input devices, image capture devices), leak detection 80, light source 81, alarms, etc., and the user interface displays 190 (e.g. including various indicators, touch screens, graphical displays, textual displays, etc.), as well as various additional components suitable for use in a cooking appliance. In some embodiments, the user interface display 190, or portions thereof, may include or be coupled with the leak detection 80 (e.g. light source, alerts, alarms, etc.) in some embodiments to alert the user of escaping microwaves. For example, the content 191*a-e* may include the leak detection 80, alert, or light source therein to indicate escaping microwaves.

Controller 15 may also be interfaced with leak detection 80 located to sense escaping microwave conditions inside of and/or external to cooking appliance 10 (e.g. light, audible/acoustic, visual, etc.). The leak detection 80 may be coupled to the controller 15 in a variety of ways (e.g. wired and/or contact pins). Such leak detection 80 may be internal or external to cooking appliance 10, and may be coupled wirelessly to controller 15 in some embodiments.

Controller 15 may also be interfaced with user interface display 190 located to communicate conditions inside of and/or external to cooking appliance 10 (e.g. light, audible/acoustic, visual, content, controls, etc.). The user interface display 190 may be coupled to the controller 15 in a variety of ways (e.g. wired and/or contact pins). Such user interface display 190 may be internal or external to cooking appliance 10, and may be coupled wirelessly to controller 15 in some embodiments. Controller 15 may manage the transparent panel 193 or additional layers to be configured between the transparent configuration and the opaque configuration, if used.

In some embodiments, controller 15 may also be coupled to one or more network interfaces, e.g., for interfacing with external devices via wired and/or wireless networks such as Ethernet, Wi-Fi, Bluetooth, NFC, cellular, and other suitable networks. Network may incorporate in some embodiments a home automation network, and various communication protocols may be supported, including various types of home automation communication protocols. In other embodiments, other wireless protocols, e.g., Wi-Fi or Bluetooth, may be used.

In some embodiments, microwave cooking appliance 10 may be interfaced with one or more user devices over the network, e.g., computers, tablets, smart phones, wearable devices, etc., and through which cooking appliance 10 may be controlled and/or cooking appliance 10 may provide user feedback. A user device, for example, may be configured to perform various operations with the user interface display and/or leak detection.

In some embodiments, controller 15 may operate under the control of an operating system and may execute or otherwise rely upon various computer software applications, components, programs, objects, modules, data structures, etc. In addition, controller 15 may also incorporate hardware logic to implement some or all of the functionality disclosed herein. Further, in some embodiments, the sequences of operations performed by controller 15 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A microwave cooking appliance comprising:

a housing having a door to form a cooking cavity, wherein the door includes an interior face arranged to face towards the cooking cavity and an exterior face arranged to face away from the cooking cavity; and the door comprising a frame having a choke groove and a multi-layered shielding panel having one or more conductive mesh layers and one or more glass layers; and one or more user interface panels are disposed over at least a portion of the choke groove.

2. The microwave cooking appliance of claim 1 wherein the one or more user interface panels are disposed over the one or more conductive mesh layers.

3. The microwave cooking appliance of claim 1 wherein the one or more user interface panels extend to an outer periphery of the choke groove.

4. The microwave cooking appliance of claim 3 wherein an outer periphery of a user interface panel of the one or more user interface panels is fully adjacent to the outer periphery of the choke groove.

5. The microwave cooking appliance of claim 1 wherein the one or more user interface panels include one or more touch screens configured to receive input from the user.

6. The microwave cooking appliance of claim 1 wherein the one or more user interface panels include at least one outer protective layer.

7. The microwave cooking appliance of claim 1 wherein the door further includes one or more conductive engagements between a remaining portion of the frame and the one or more conductive mesh layers.

8. The microwave cooking appliance of claim 7 wherein the one or more conductive engagements include at least one of a conductive glass sealant, a conductive gasket, a conductive tape, and/or a mechanical fastener electrically grounding the remaining portion of the frame to the one or more conductive mesh layers.

9. The microwave cooking appliance of claim 8 includes the conductive glass sealant.

10. The microwave cooking appliance of claim 8 includes the conductive gasket.

11. The microwave cooking appliance of claim 8 includes the conductive tape, wherein the conductive tape surrounds an outer edge of the one or more conductive mesh layers and one or more glass layers.

12. The microwave cooking appliance of claim 1 wherein the door includes one or more first contact pins and a remaining portion of the housing having one or more second contact pins, wherein the one or more first contact pins engage the one or more second contact pins when the door is in a closed position and wherein the one or more first contact pins are disengaged from the one or more second contact pins when the door is in an open position.

13. The microwave cooking appliance of claim 1 wherein at least a portion of the choke groove is made of the one or more conductive mesh layers and the one or more glass layers.

14. The microwave cooking appliance of claim 1 wherein a remaining portion of the frame is molded to the one or more conductive mesh layers.

15. A microwave door comprising:

an interior face arranged to face towards the cooking cavity and an exterior face arranged to face away from the cooking cavity;

a frame having a choke groove extending along an outer periphery of the frame and one or more conductive mesh layers and one of more glass layers; and one or more user interface panels having an outer periphery, wherein the outer periphery of the one or more user interface panels are disposed over at least a portion of the choke groove of the frame.

16. The microwave door of claim 15 wherein the one or more user interface panels include one or more outer protective layers.

17. The microwave door of claim 15 the one or more user interface panels include at least one touch screen configured to receive input from the user.

18. The microwave door of claim 15 wherein the outer periphery of the one or more user interface panels are disposed entirely over an exterior face of the choke groove and/or the exterior face of the door.

19. The microwave door of claim 15 wherein the one or more conductive mesh layers allow at least 80% optical transmittance into the cooking cavity and include an EMI shielding effectiveness of about 30 dB to about 70 dB.

20. The microwave door of claim 15 further comprises one or more conductive engagements between at least a portion of the frame and the one or more conductive mesh layers, wherein both the one or more conductive mesh layers and the one or more conductive engagements are exterior to the portion of the frame in a direction from the interior face of the door to the exterior face of the door.

21. A door for a microwave cooking appliance comprising:

a frame having an outer periphery and a choke groove extending along the outer periphery, wherein the frame includes a multi-layered shielding panel having one or more conductive mesh layers and one or more glass layers, and wherein the one or more conductive mesh layers are electrically grounded by one or more conductive engagements between a remaining portion of the frame and the one or more conductive mesh layers;

one or more user interface panels are disposed over at least a portion of the frame and disposed over the one or more conductive mesh layers and the one or more glass layers; and wherein in a direction from an interior face of the door towards an exterior face of the door, the one or more conductive mesh layers are at least followed by the one or more conductive engagements, and then followed by the one or more user interface panels.

22. The door of claim 21 wherein the one or more conductive mesh layers include an EMI shielding effectiveness of about 30 dB to about 70 dB while maintaining optical transmittance of about 88% to about 99%.

23. The door of claim 21 wherein the one or more user interface panels include a touch screen configured to receive input from the user.

24. The door of claim 21 wherein the one or more user interface panels include an outer protective layer.

25. The door of claim 21 wherein the one or more user interface panels are disposed over at least a portion of the choke groove.

* * * * *